United States Patent
Miller

(10) Patent No.: US 12,121,944 B2
(45) Date of Patent: Oct. 22, 2024

(54) THREE-DIMENSIONAL PRINTED COMPOSITIONS USING ORGANIC SUBSTRATES SUCH AS COFFEE, PISTACHIO SHELLS AND COCONUT SHELLS, WITH BACTERIA-BASED BINDERS, COATINGS FOR THREE-DIMENSIONAL PRINTED COMPOSITIONS, AND PROCESSES RELATED TO THE SAME

(71) Applicant: Common Grounds Lab Inc., Marion, IN (US)

(72) Inventor: Jake Miller, Fishers, IN (US)

(73) Assignee: Common Ground Lab Inc., Marion, IN (US)

( * ) Notice: Subject to any disclaimer, the term of this patent is extended or adjusted under 35 U.S.C. 154(b) by 0 days.

(21) Appl. No.: 17/916,396

(22) PCT Filed: Mar. 30, 2020

(86) PCT No.: PCT/US2020/025798
§ 371 (c)(1),
(2) Date: Sep. 30, 2022

(87) PCT Pub. No.: WO2021/201830
PCT Pub. Date: Oct. 7, 2021

(65) Prior Publication Data
US 2023/0143142 A1    May 11, 2023

(51) Int. Cl.
*B09B 3/21* (2022.01)
*B33Y 10/00* (2015.01)
(Continued)

(52) U.S. Cl.
CPC ............. *B09B 3/21* (2022.01); *B33Y 10/00* (2014.12); *B33Y 40/20* (2020.01); *B33Y 70/10* (2020.01); *B33Y 80/00* (2014.12)

(58) Field of Classification Search
CPC ......... B33Y 10/00; B33Y 40/20; B33Y 80/00; B33Y 70/10
See application file for complete search history.

(56) References Cited

U.S. PATENT DOCUMENTS 6,042,690 A    3/2000  Bhattacharjee et al.
6,565,729 B2   5/2003  Chen et al.
(Continued)

FOREIGN PATENT DOCUMENTS

CN    109626909 A    4/2019
EP      2814790 B1    1/2019
(Continued)

OTHER PUBLICATIONS

PCT International Search Report and Written Opinion completed by the ISA/US on Jul. 15, 2020 and issued in connection with PCT/US2020/025798. 23 pages.

(Continued)

*Primary Examiner* — Daniel Mcnally
(74) *Attorney, Agent, or Firm* — Barnes & Thornburg LLP

(57) ABSTRACT

The use of bacteria-based binders to bind and strengthen 3D printed compositions; bio-plastic 3D printing materials comprised of combinations of particles of organic substrates such as coffee, pistachio shells and coconut shells, as well as sand (and combinations of one or more of the foregoing); processes for creating scent-free bio-plastic 3D printing material and products from such particles; the application of a copper finish, chrome finish and powder finish to bio-plastics made from such particles; and products and fixtures, such as sinks, toilets, faucets, coffee mug molds, lighting fixtures, and coffee cups, comprising non-flammable bio-plastic created by a process of 3D printing from such particles. Processes for imparting color or structure or sur- (Continued)

face texture to these and binding and strengthening them using enzyme-secreting bacteria.

20 Claims, 28 Drawing Sheets

(51) Int. Cl.
  *B33Y 40/20* (2020.01)
  *B33Y 70/10* (2020.01)
  *B33Y 80/00* (2015.01)

(56) References Cited

U.S. PATENT DOCUMENTS

| | | |
|---|---|---|
| 2007/0172599 A1 | 7/2007 | Lewis et al. |
| 2009/0238981 A1 | 9/2009 | Decker et al. |
| 2017/0164650 A1 | 6/2017 | Diaz et al. |
| 2017/0210063 A1 | 7/2017 | Andres et al. |
| 2017/0297263 A1* | 10/2017 | Ederer .................... C09D 7/61 |

FOREIGN PATENT DOCUMENTS

| | | |
|---|---|---|
| WO | 2013/0120847 A1 | 8/2013 |
| WO | 2019/054969 A2 | 3/2019 |

OTHER PUBLICATIONS

Durnell, A. Interior Products Made From Recycled Coffee Grounds. Dec. 3, 2019 (online], (retrieved on Jul. 14, 2020]. Retrieved from the Internet <URL: https://materialdistrict.com/article/interior-products-recycled-coffee-grounds/>. 3 pages.

Gonzalez, LM et al. Resilient Living Materials Built By Printing Bacterial Spores. bioRxiv. Feb. 2, 2019. DOI: 10.1101/537571. 30 pages.

Bajpai, P. Environmentally Benign Approaches for Pulp Bleaching. 2012. [online], [retrieved on Jul. 14, 2020). Retrieved from the Internet <URL: https://books.google.com/books?. 3 pages.

Medlock, K. Now you can 3D print with recycled coffee grounds. Sep. 25, 2015 (online], (retrieved on Jul. 14, 2020). Retrieved from the Internet <URL: https://inhabitat.com/now-you-can-3d-print-with-recycled-coffee-grounds/>. 3 pages.

\* cited by examiner

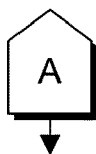

0153
Clean the 3D printed object; this may be done by any suitable means such as one or more of the following means: compressed air or shaking.

0154
Infuse the 3D printed object with a layer of metallized epoxy or non-metallized epoxy either by painting the chosen epoxy on or by coating the 3D printed object with a metallized epoxy or a non-metallized epoxy in a vacuum;

0155
Dry the infused metallized epoxy or non-metallized epoxy.

0156
Sand the infused metallized epoxy or non-metallized epoxy to the desired finish.

0157
Place a seed layer of copper on the 3D printed object.

0158
Electroplate the 3D printed object in copper.

End

FIG. 13

THREE-DIMENSIONAL PRINTED COMPOSITIONS USING ORGANIC SUBSTRATES SUCH AS COFFEE, PISTACHIO SHELLS AND COCONUT SHELLS, WITH BACTERIA-BASED BINDERS, COATINGS FOR THREE-DIMENSIONAL PRINTED COMPOSITIONS, AND PROCESSES RELATED TO THE SAME

CROSS-REFERENCE TO RELATED CASE

This application is a U.S. national counterpart application of International Application Serial No. PCT/US2020/025798 filed Mar. 30, 2020, the disclosure of which is expressly incorporated by reference herein in its entirety.

TECHNICAL FIELD

This application relates to 3D printing technology, including the use of coffee, sand, pistachio shells, and coconut shells in 3D printing technology and using the same to create 3D printed objects, such as sinks, toilets, faucets, coffee mug molds, lighting fixtures, coffee cups and other products, that do not have the scent of coffee, pistachios or coconuts and that can be coated with coverings such as copper, chrome and nickel. A process for using bacteria-based binders in connection with 3D printing technology is also disclosed. This application further discloses processes for changing the color or surface texture of these substances after they have been 3D printed and for using bacteria to bind or add strength to these substances when they are 3D printed. Additionally, this application discloses processes for changing the color or surface texture of these substances before or after they have been 3D printed and for using bacteria to bind or add strength to these substances when they are 3D printed.

BACKGROUND OF THE INVENTION

The use of coffee in 3D printing has resulted in the patenting of some compositions of matter and methods.

Von Hasseln, in US 2013/0034633 and CN 106957378A, "3D Printing Preparation Method of Polymer-based Gradient Material", taught a system and method for using 3D printing to make edible products and which mentioned coffee as a food material that could act as a printing substrate.

A Korean patent, KR 20170102588A, "Coffee Waste Recycled 3D Architecture Tile", taught the use of 3D printing, coffee grounds, foil, wood chips, PLA polymer, and a laser cutter, to create three-dimensional effects on the surface of tile and exterior building materials.

However, these references do not teach the apparatuses, compositions of matter or the processes that are disclosed and described in this application.

SUMMARY OF INVENTION

Technical Problems

Coffee grounds are typically seen as a waste byproduct of coffee brewing and often are disposed of as refuse. Pistachio and coconut shells are also typically seen as waste products. The problem thus exists as to how and whether coffee grounds, pistachio shells, coconut shells, and sand can be used, separately or in combination, to construct new and useful products and, specifically, how to create products from 3D printed coffee grounds, pistachio shells, coconut shells, and sand (or combinations thereof) without the scents associated with coffee grounds, pistachio shells, or coconut shells, how to make such products that may or may not be flammable and how to coat such products with surfaces such as copper, chrome and nickel.

Once 3D printed objects have been created from coffee grounds, pistachio shells, coconut shells, sand or a combination thereof, there is the problem of how to impart color to such 3D printed objects.

Additionally, there is the problem of how to find a greener and more environmentally friendly binder that can be used to strengthen 3D printed objects.

Solutions to the Problems

One solution to the problem of how to dispose of coffee grounds, pistachio shells, and coconut shells is to use these materials alone or in combination, or combine one or more of these materials with sand to create new and useful products as claimed herein, such as sinks, toilets, faucets, coffee mug molds, lighting fixtures, coffee cups and other products, using 3D printing. Although certain specific products are identified in the examples provided below, a person having ordinary skill in the art will appreciate that the processes and compositions taught herein are applicable to a wide range of consumer goods and durable goods as demonstrated by the diversity of the types of products referenced herein.

A solution to the problem of how to impart color to 3D printed materials from coffee grounds, pistachio shells, and coconut shells is to use a combination of ozone and ultraviolet electromagnetic radiation ("UV") or a bleaching solution such as diluted sodium sulfite and sodium hydroxide.

A solution to the problem of how to bind coffee grounds, pistachio shells, coconut shells, and other organic substrates, including in combination with sand or other substrates, in 3D printing in an environmentally friendly manner is to combine them with enzyme-producing bacteria such as *Sporosarcina Pasteurii, Sporosarcina Ureae, Proteus Vulgaris, Bacillus Sphaericus, Myxococcus Xanthus, Proteus Mirabilis, Helicobacter Pylori* or a combination thereof, and a food source for the enzyme-producing bacteria, so that the enzyme-producing bacteria will produce calcium carbonate, to bind and harden the 3D printed materials.

Advantageous Effects of the Disclosed Embodiments

One advantage of the disclosed embodiments is that they enable coffee grounds, pistachio shells, coconut shells, sand, or a combination thereof, to be used to produce useful items that normally cannot be readily fabricated from those items.

Another advantage of the disclosures contained in this document is that they teach how to impart color to 3D printed objects comprising coffee grounds, pistachio shells, and coconut shells.

Yet another advantage of the disclosures contained in this document is that they teach an environmentally friendly manner of using microbial induced calcite precipitation to bind and harden together coffee grounds, pistachio shells, coconut shells, organic substrates, sand, or a combination thereof, as filler in 3D printing by using a bacteria-based binder, a food source, a nitrogen source, a calcium source, and trace amounts of carbon.

Although certain specific products are identified in the examples provided below, a person having ordinary skill in the art will appreciate that the processes and compositions taught herein are applicable to a wide range of consumer goods and durable goods as demonstrated by the diversity of the types of products referenced herein.

BRIEF DESCRIPTION OF THE DRAWINGS

FIG. 13 is the second page of a multi-page flowchart showing steps in the process described in the ninth exemplary embodiment.

DESCRIPTION OF THE DISCLOSED EMBODIMENTS

Figure 1:
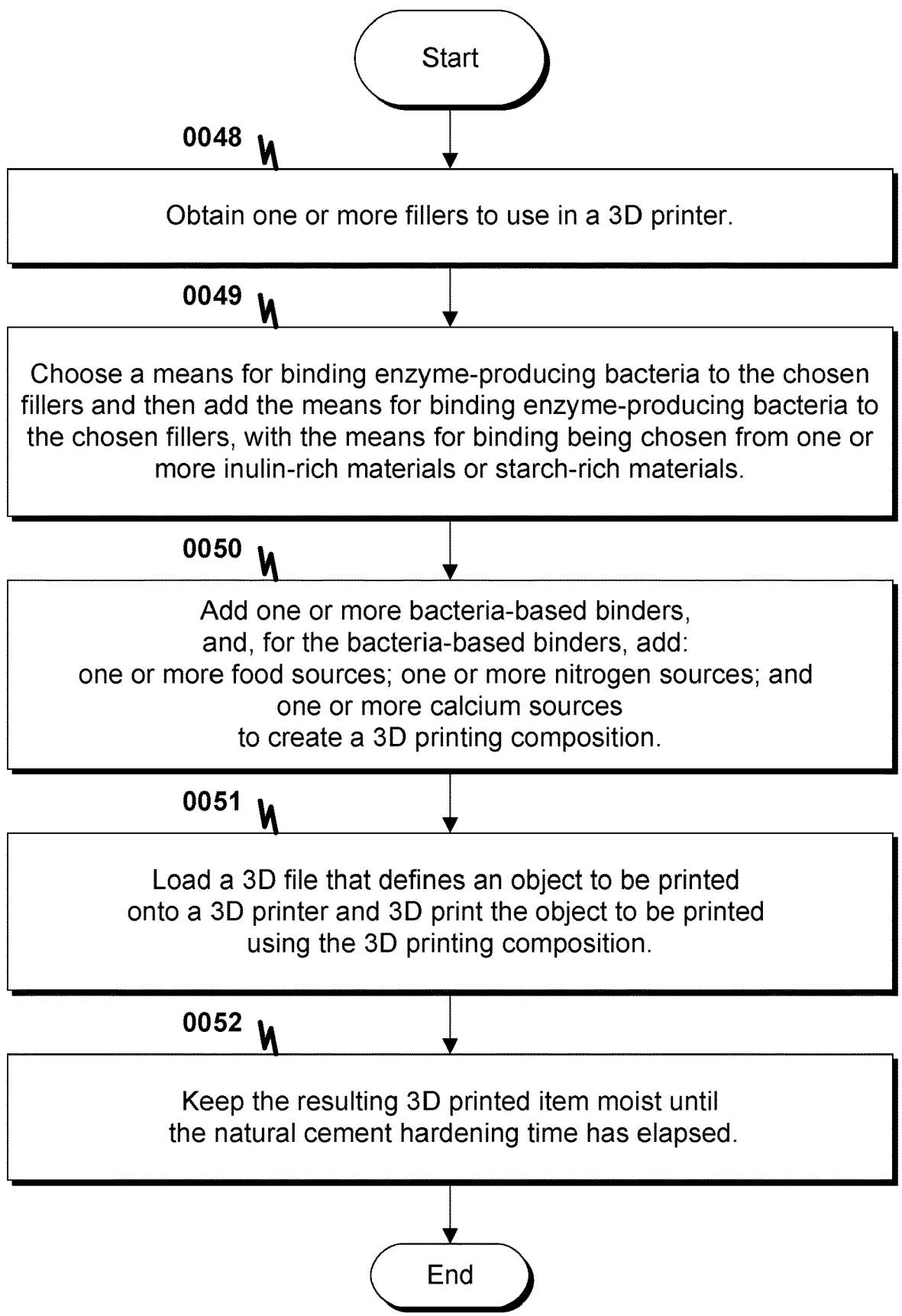
FIG. 1 is a flowchart showing steps in the process described in the first exemplary embodiment for a process for using enzyme-producing bacteria to bind and harden 3D printed compositions that use a filler.
Figure 2:
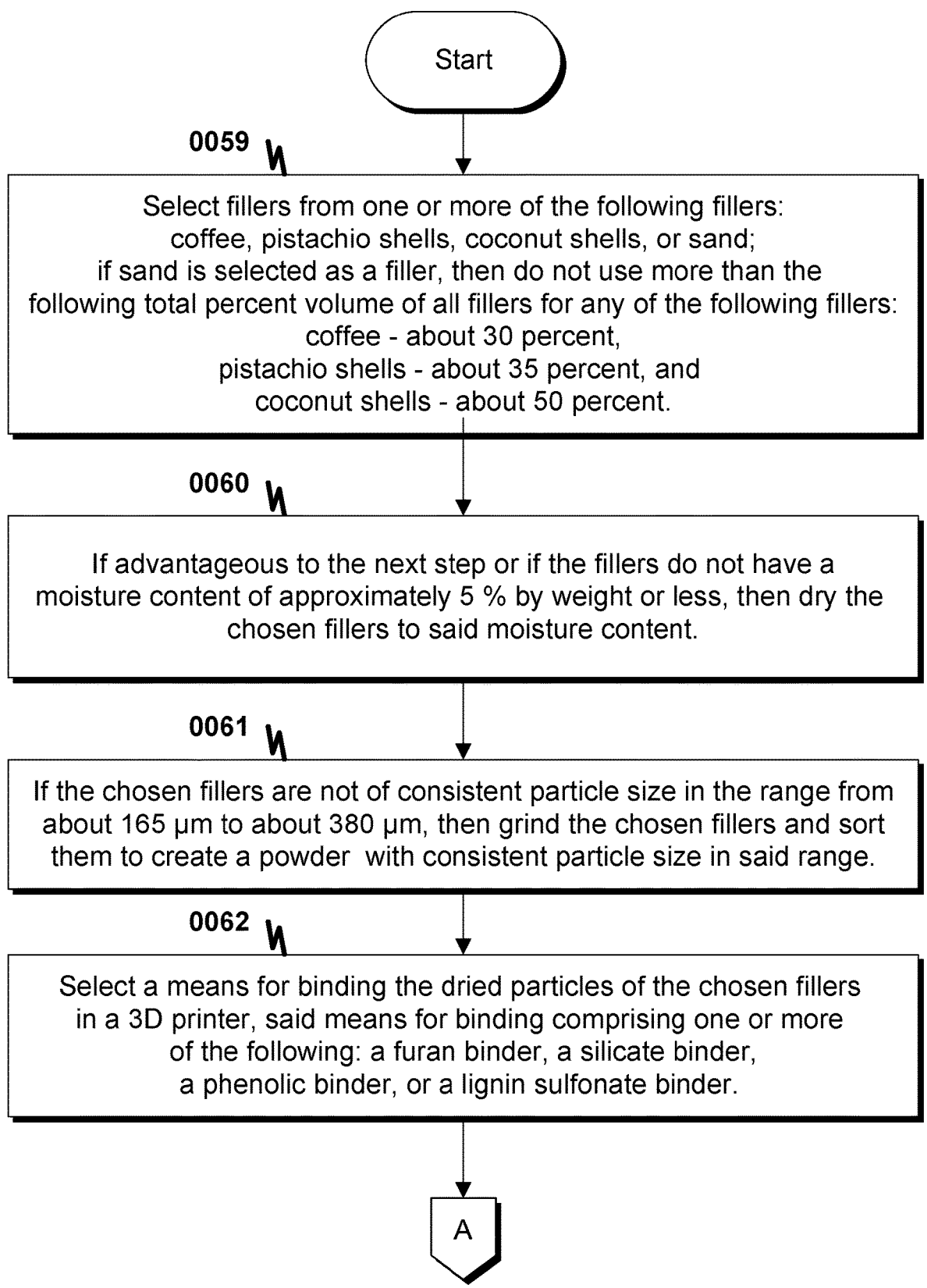
FIG. 2 is the first page of a multi-page flowchart showing steps in the process described in the second exemplary embodiment for a process for using coffee, pistachio shells, coconut shells, sand, or combinations thereof, as fillers in 3D printing.
Figure 3:
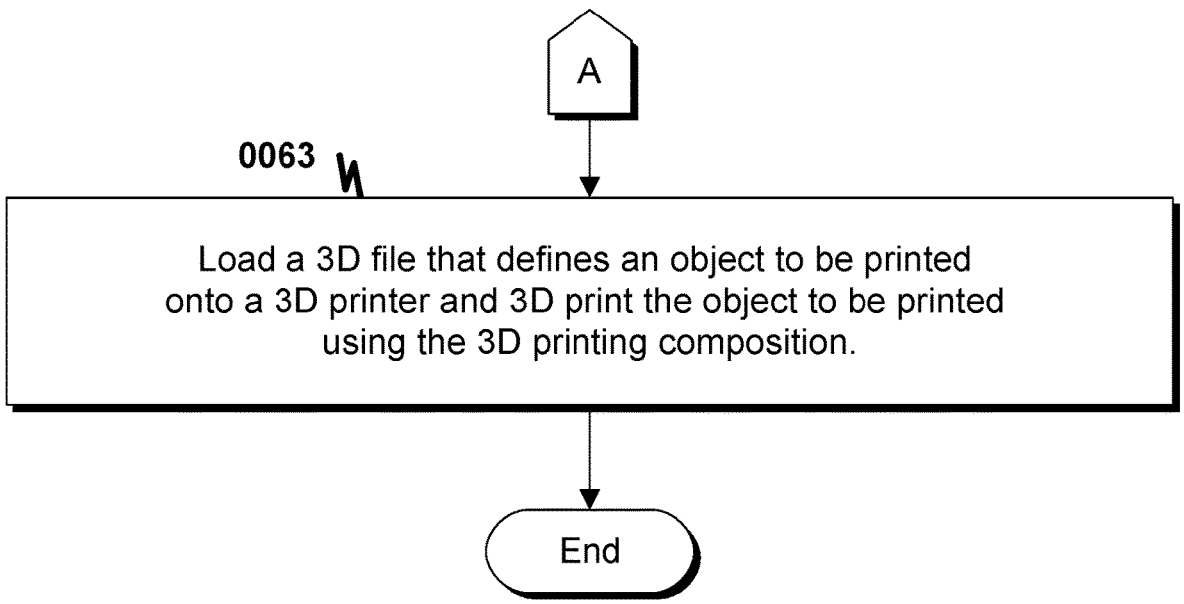
FIG. 3 is the second page of a multi-page flowchart showing steps in the process described in the second exemplary embodiment.
Figure 4:
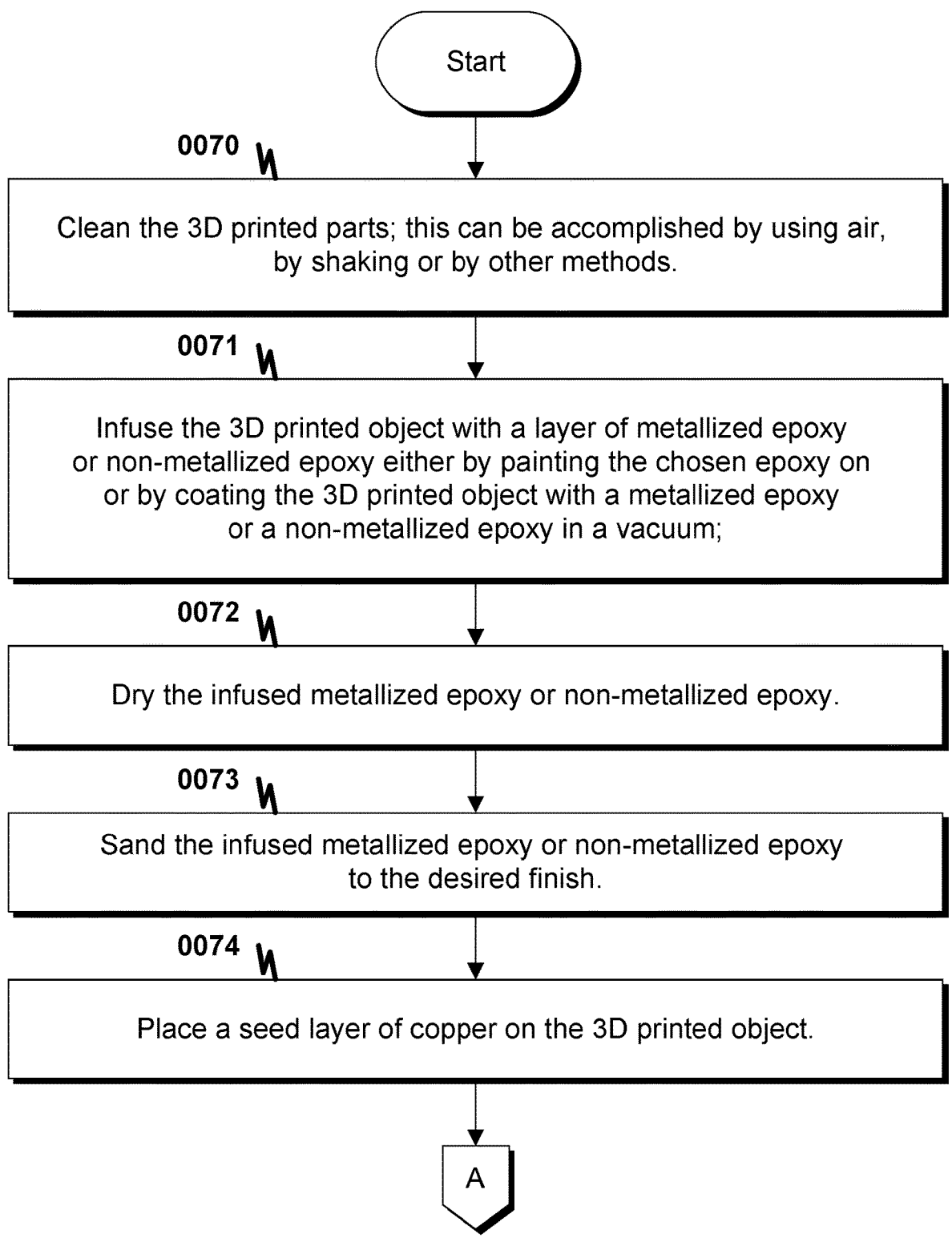
FIG. 4 is the first page of a multi-page flowchart showing steps in the process described in the third exemplary embodiment for a process for plating or covering products that are comprised of coffee, pistachio shells, coconut shells, organic substrates and any combination thereof.
Figure 5:
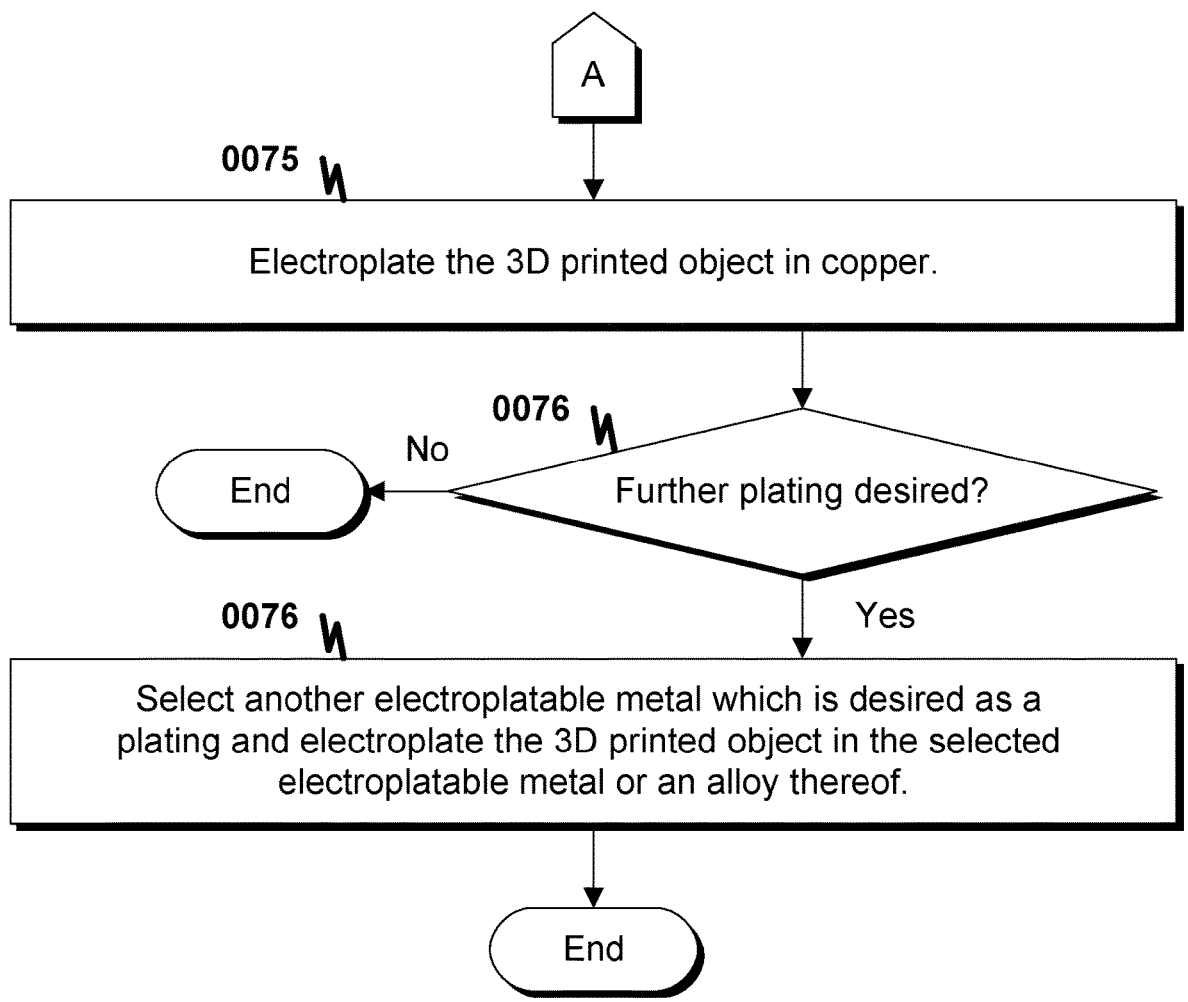
FIG. 5 is the second page of a multi-page flowchart showing steps in the process described in the third exemplary embodiment.
Figure 6:
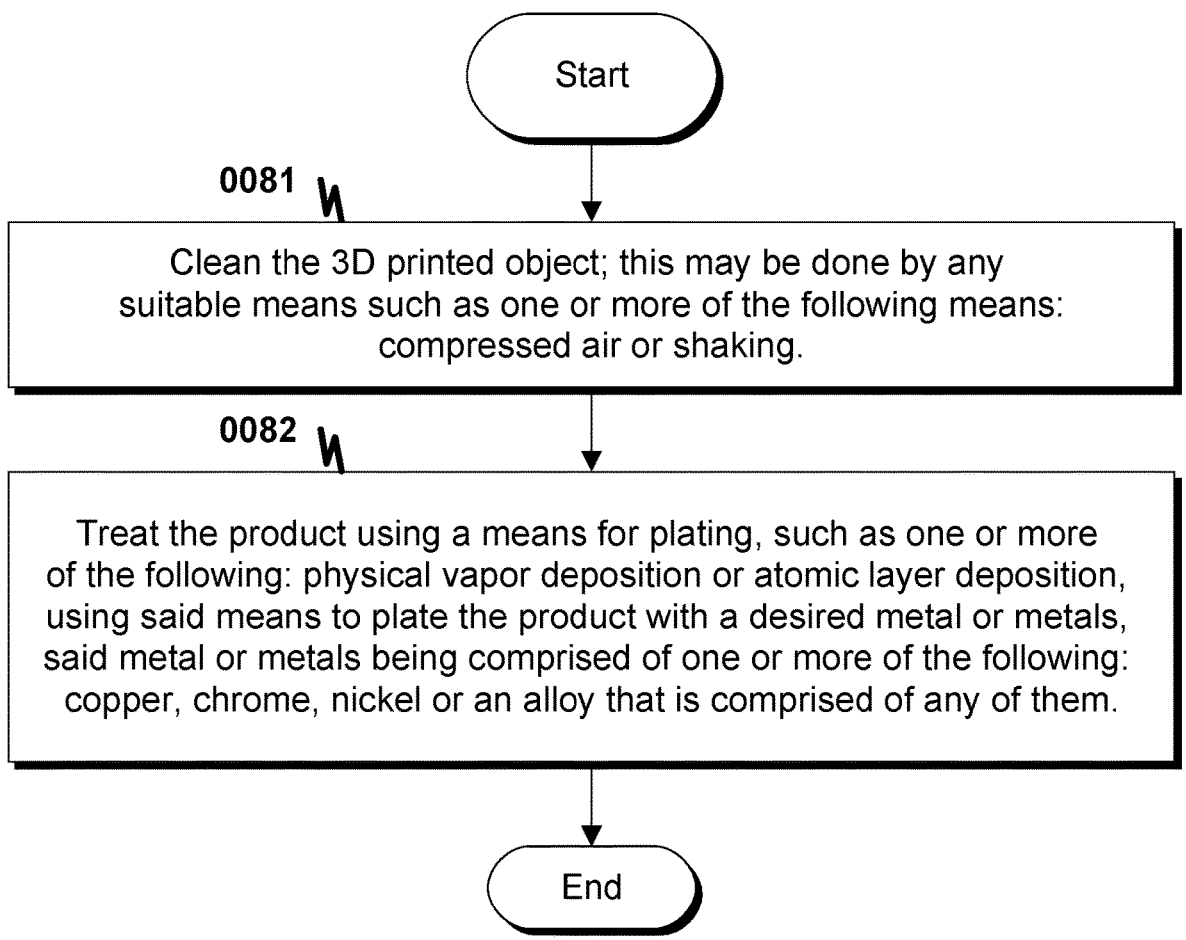
FIG. 6 is a flowchart showing steps in the process described in the fourth exemplary embodiment for a process for plating or covering products that are comprised of coffee, pistachio shells, coconut shells, organic substrates and any combination thereof.
Figure 7:
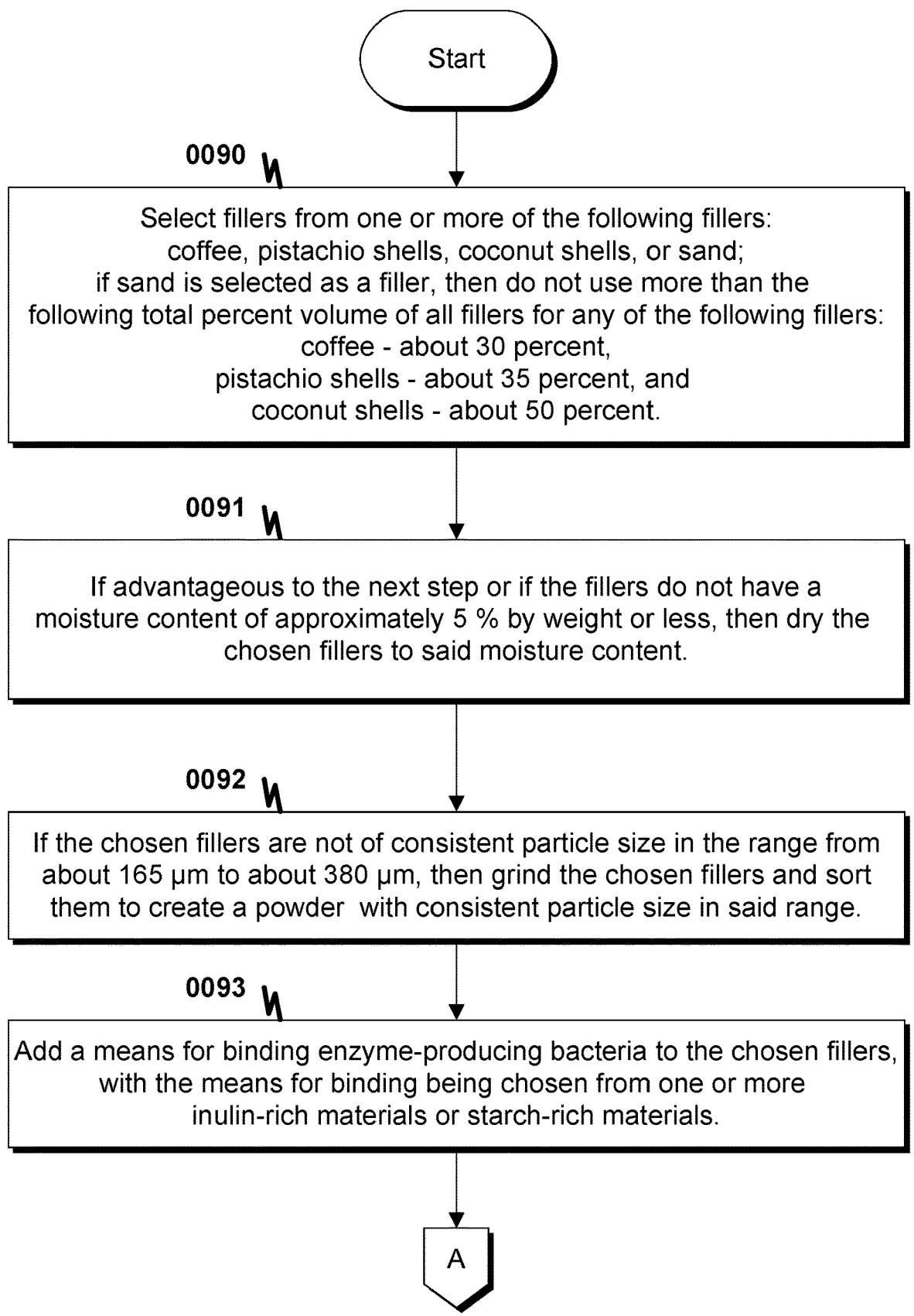
FIG. 7 is the first page of a multi-page flowchart showing steps in the process described in the fifth exemplary embodiment for a process for using enzyme-producing bacteria to bind and harden 3D printed compositions comprising one or more of the following fillers: coffee, pistachio shells, coconut shells, sand or other organic substrates.
Figure 8:
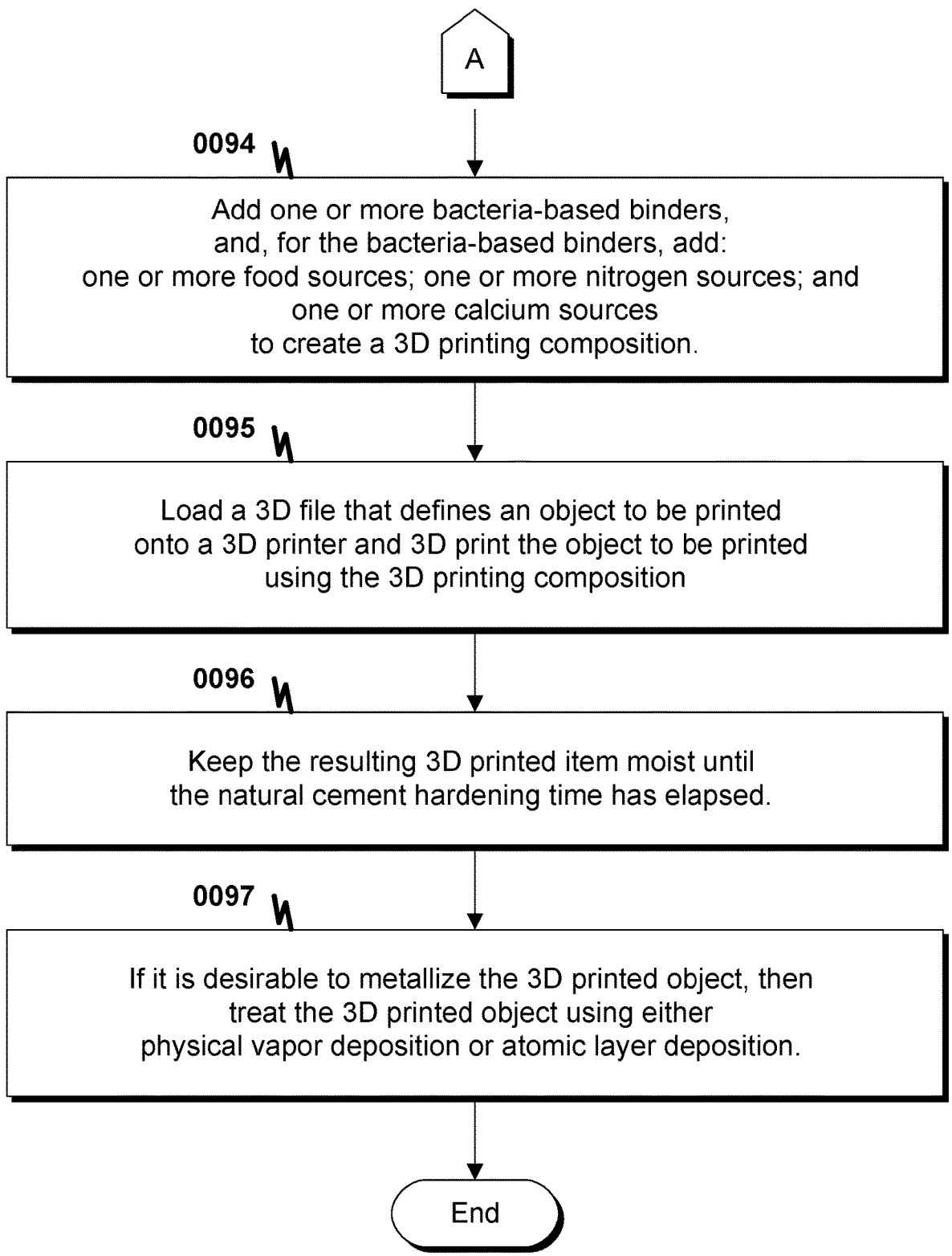
FIG. 8 is the second page of a multi-page flowchart showing steps in the process described in the fifth exemplary embodiment.
Figure 9:
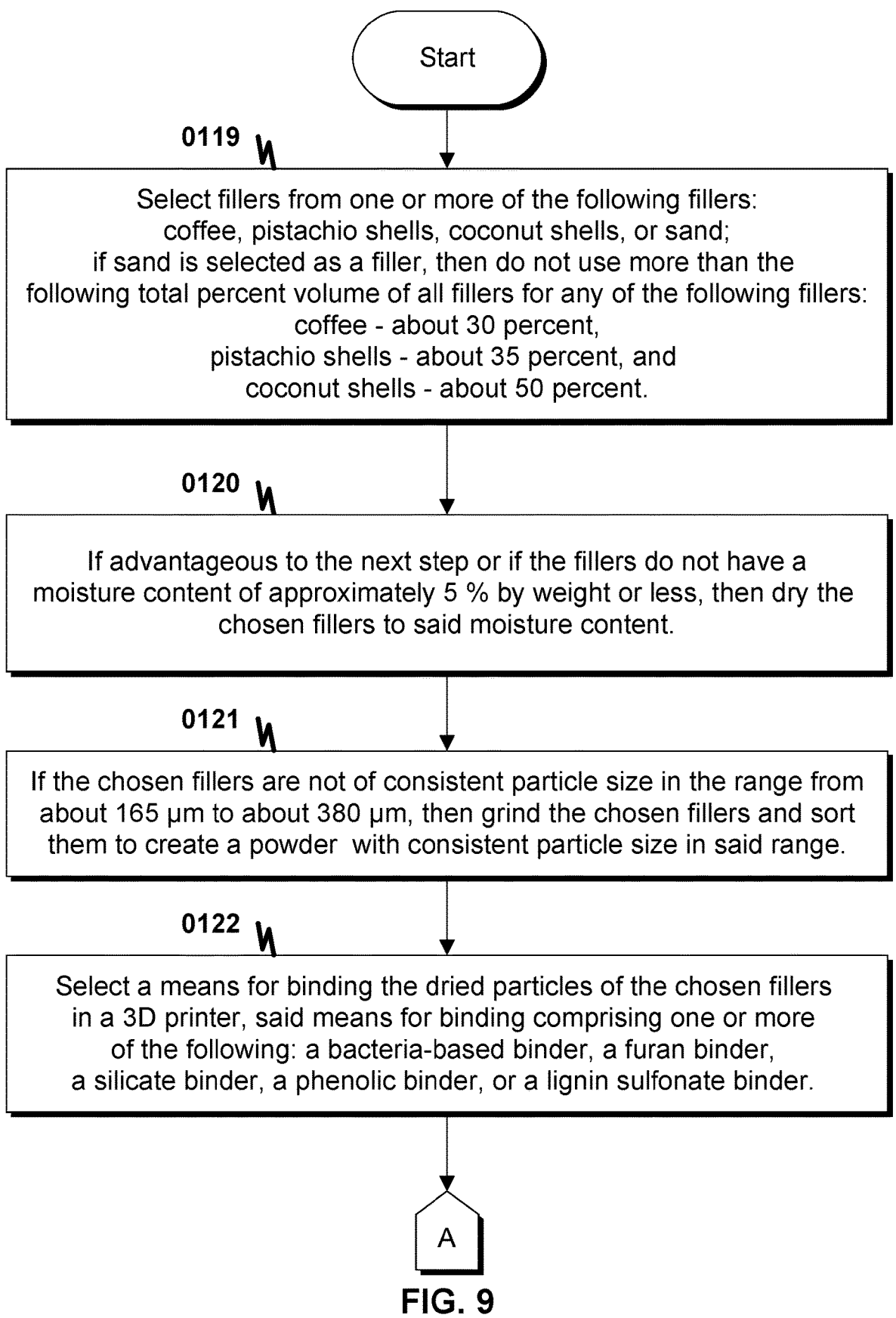
FIG. 9 is the first page of a multi-page flowchart showing steps in the process described in the seventh exemplary embodiment for a process for creating bio-plastic 3D printing made of one or more fillers of coffee, pistachio shells, coconut shells, or sand, when flammability is irrelevant.
Figure 10:
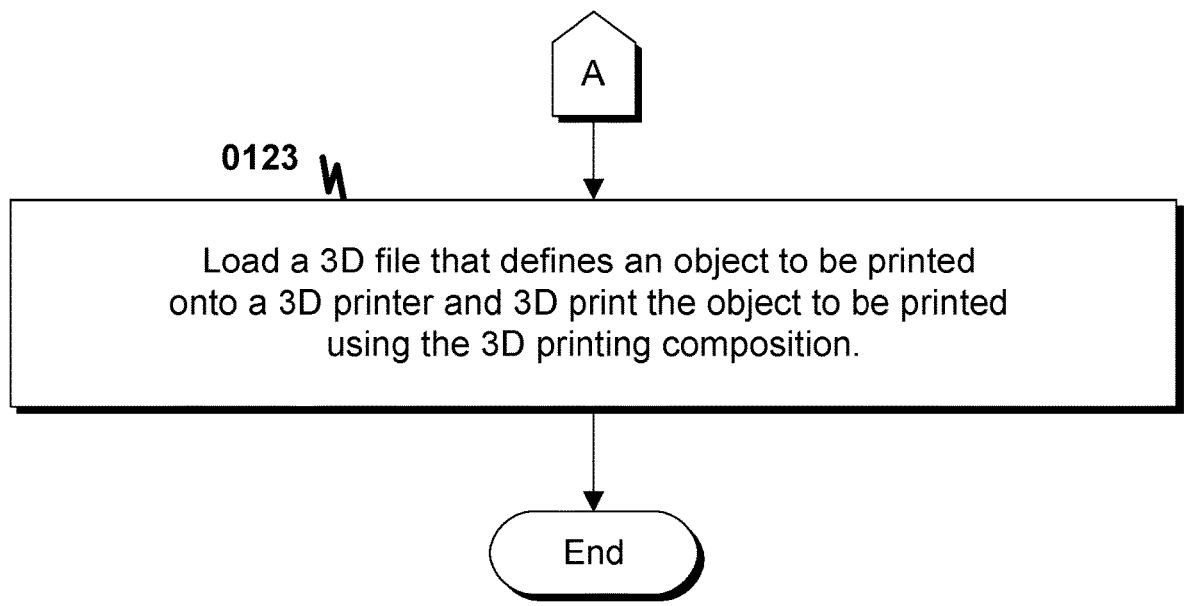
FIG. 10 is the second page of a multi-page flowchart showing steps in the process described in the seventh exemplary embodiment.
Figure 11:
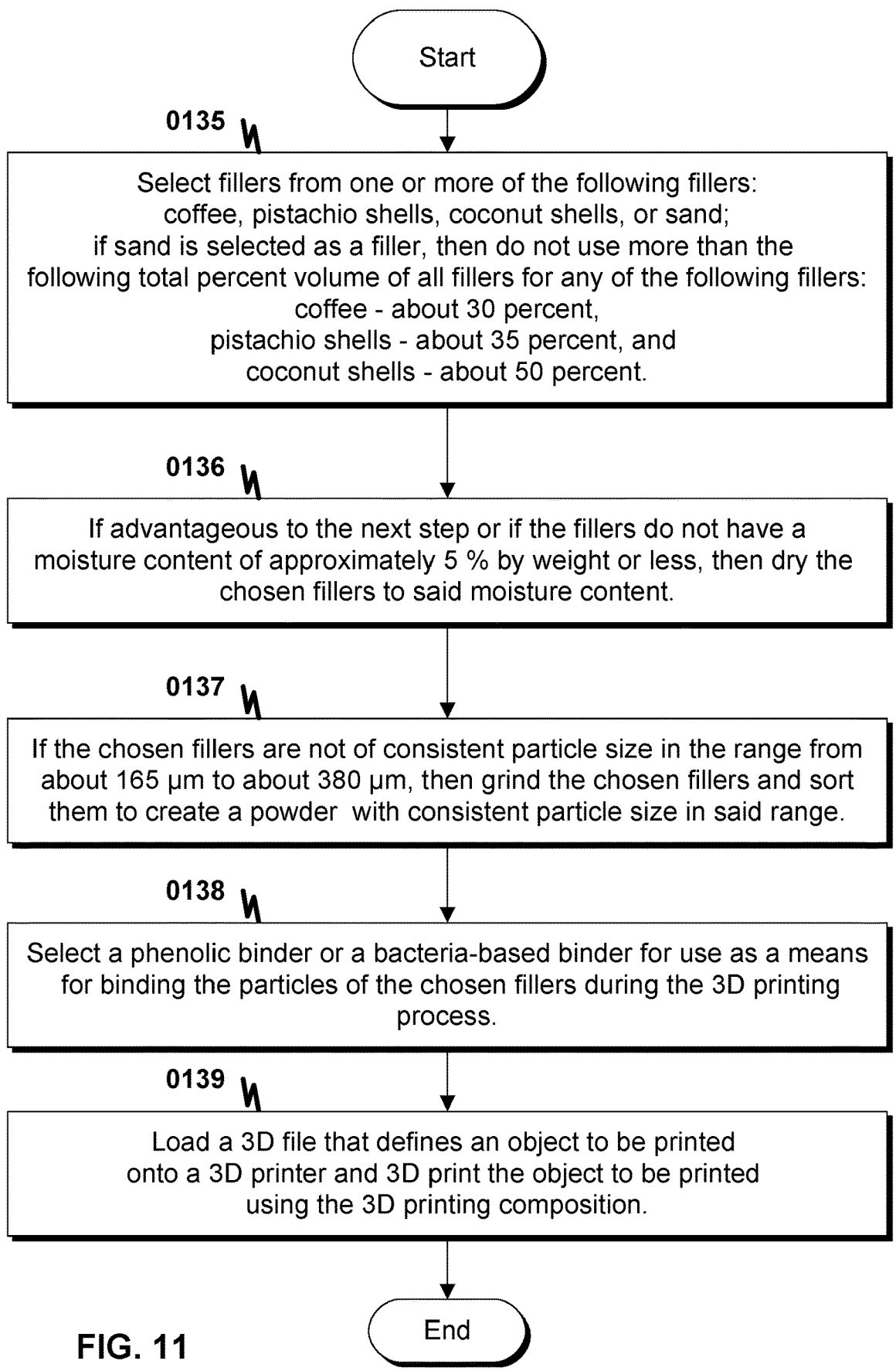
FIG. 11 is a flowchart showing steps in the process described in the eighth exemplary embodiment for a process for creating non-flammable bio-plastic 3D printing material made from one or more fillers of coffee, pistachio shells, coconut shells, or sand.
Figure 12:
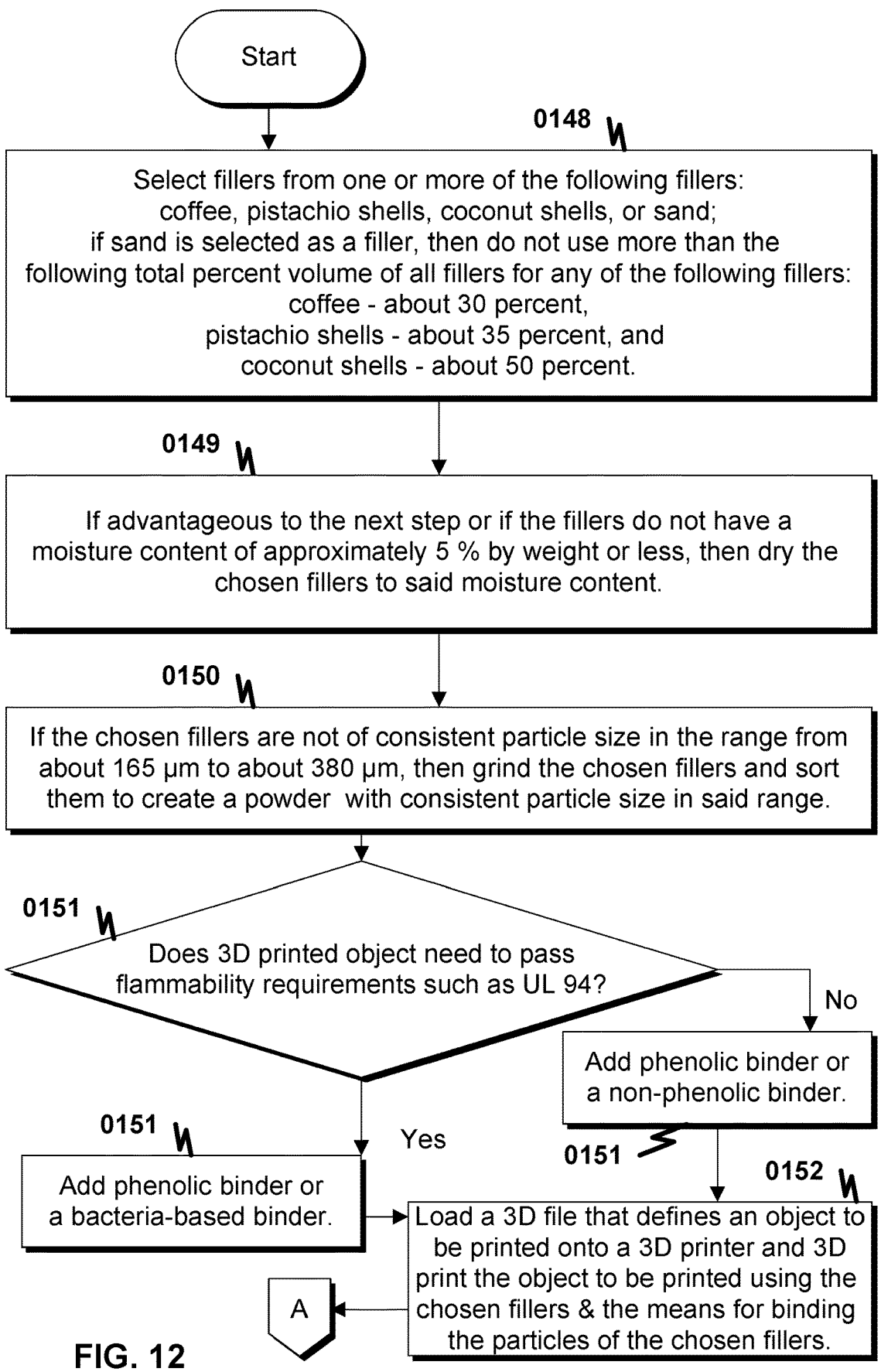
FIG. 12 is the first page of a multi-page flowchart showing steps in the process described in the ninth exemplary embodiment for a process of copper electroplating bio-plastics made from one or more fillers of coffee, pistachio shells, coconut shells, or sand.
Figure 14:
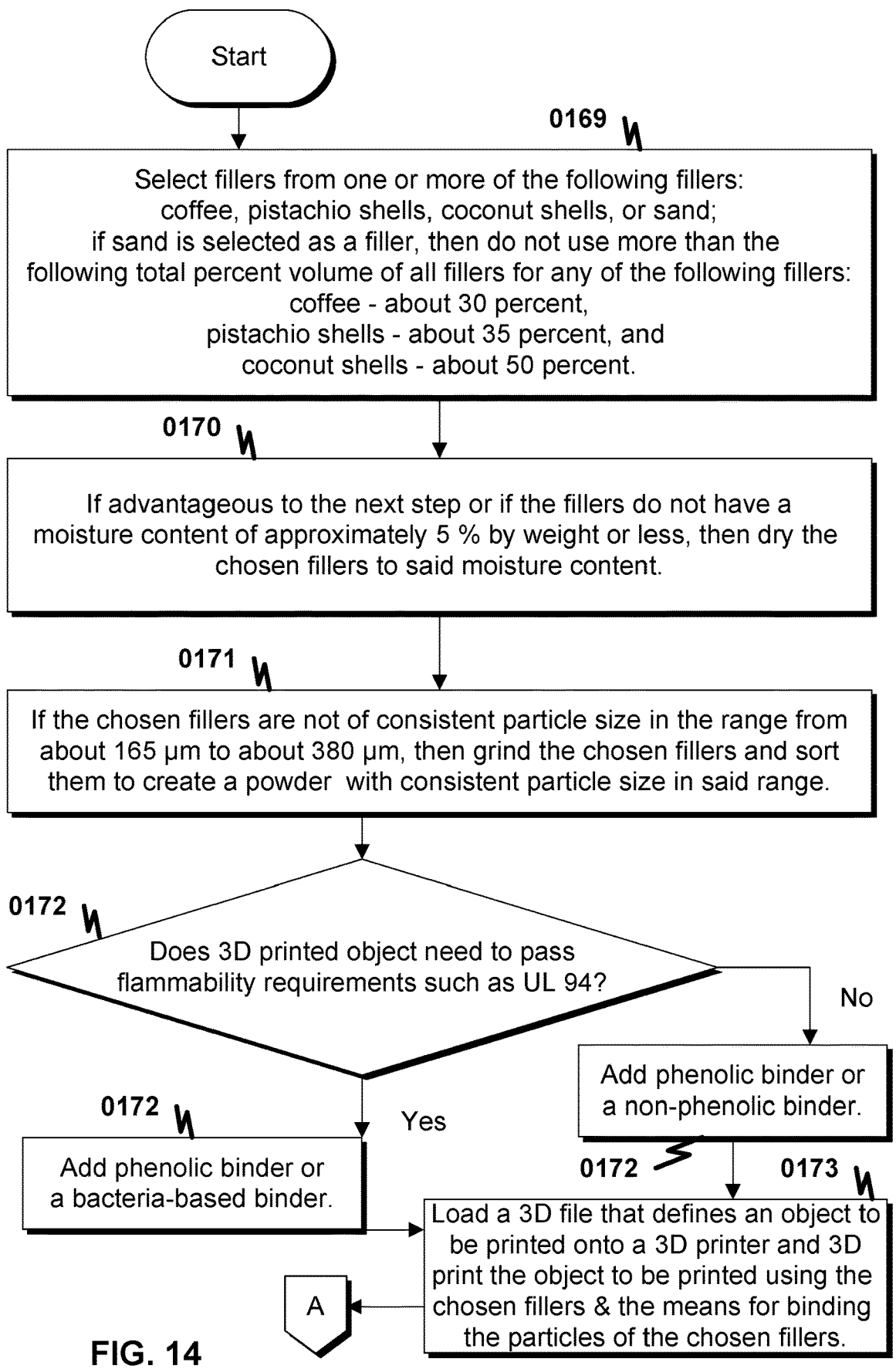
FIG. 14 is the first page of a multi-page flowchart showing steps in the process described in the tenth exemplary embodiment for a process of chrome electroplating bio-plastics made from one or more fillers of coffee, pistachio shells, coconut shells, or sand.
Figure 15:
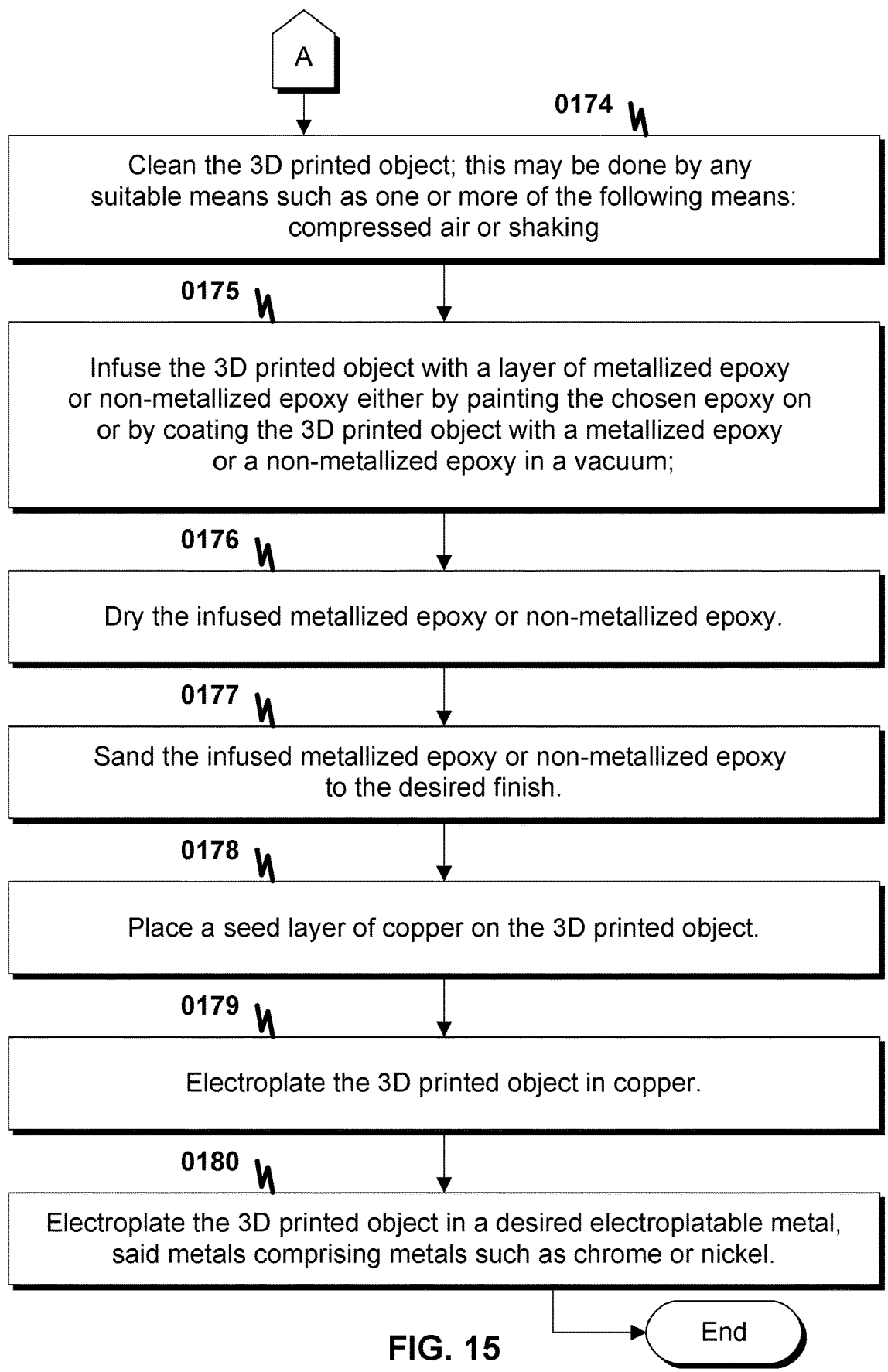
FIG. 15 is the second page of a multi-page flowchart showing steps in the process described in the tenth exemplary embodiment.
Figure 16:
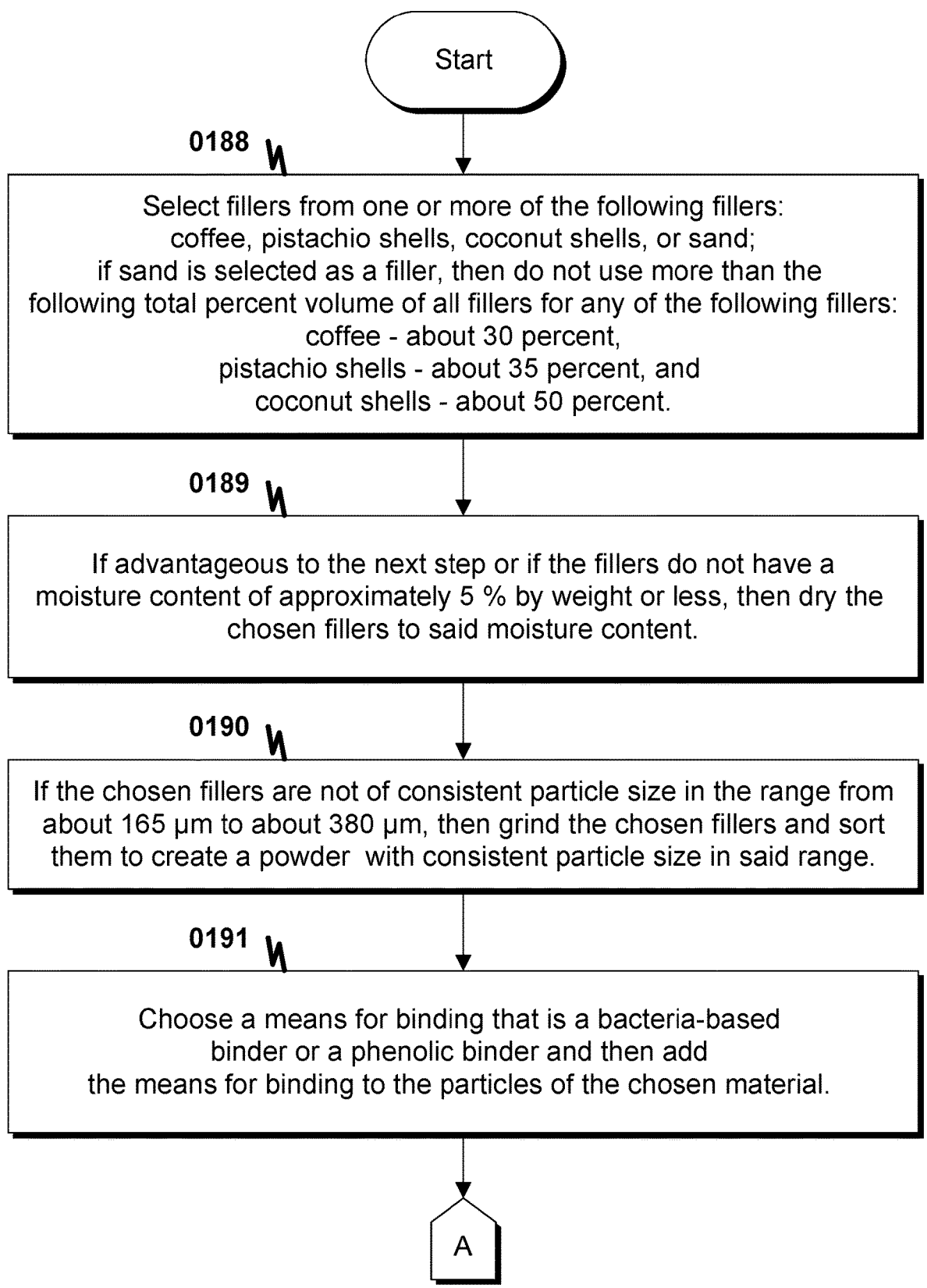
FIG. 16 is the first page of a multi-page flowchart showing steps in the process described in the eleventh exemplary embodiment for lighting fixtures by process of 3D printing of non-flammable bio-plastic made from one or more fillers of coffee, pistachio shells, coconut shells, or sand.
Figure 17:
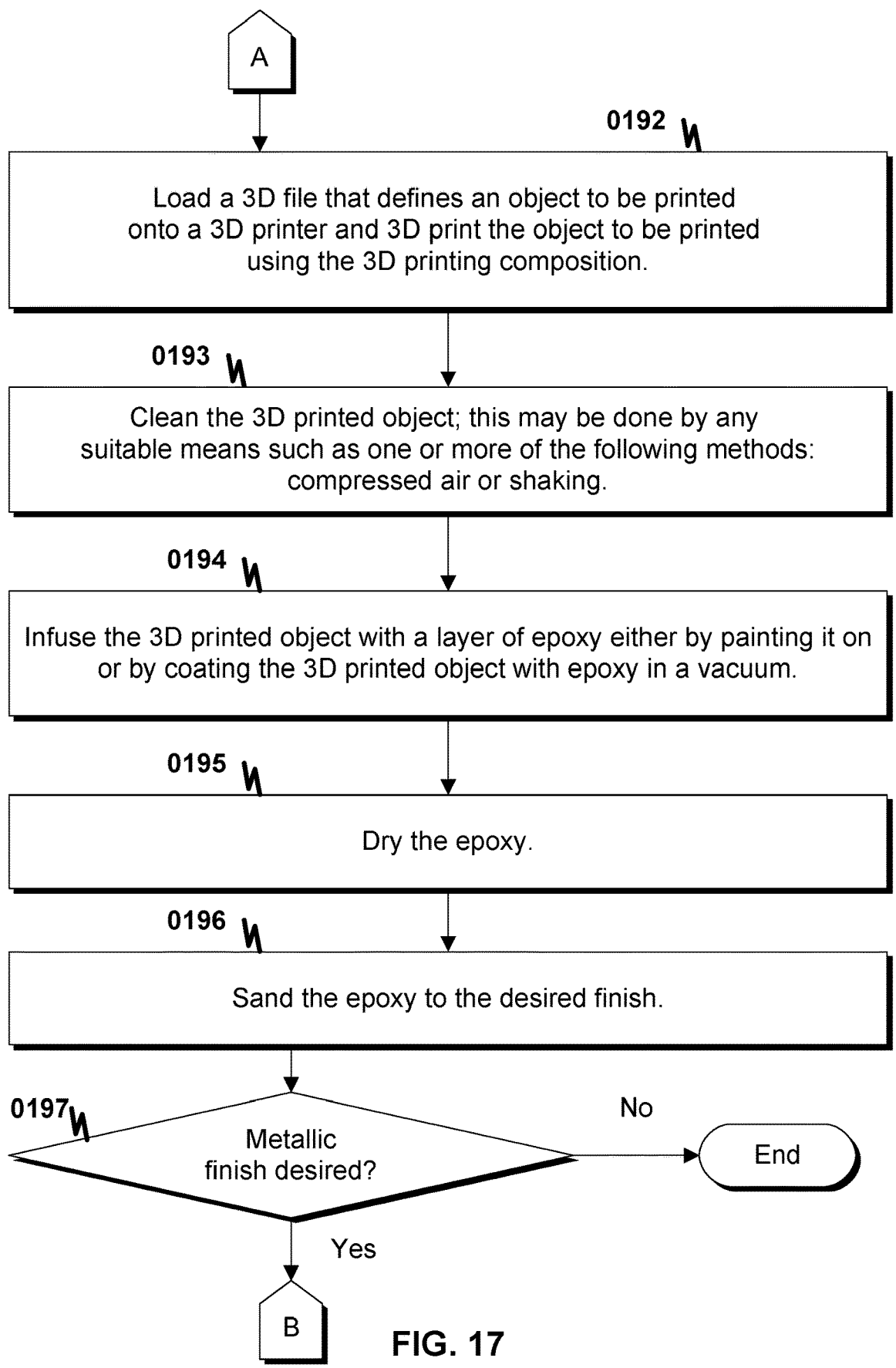
FIG. 17 is the second page of a multi-page flowchart showing steps in the process described in the eleventh exemplary embodiment.
Figure 18:
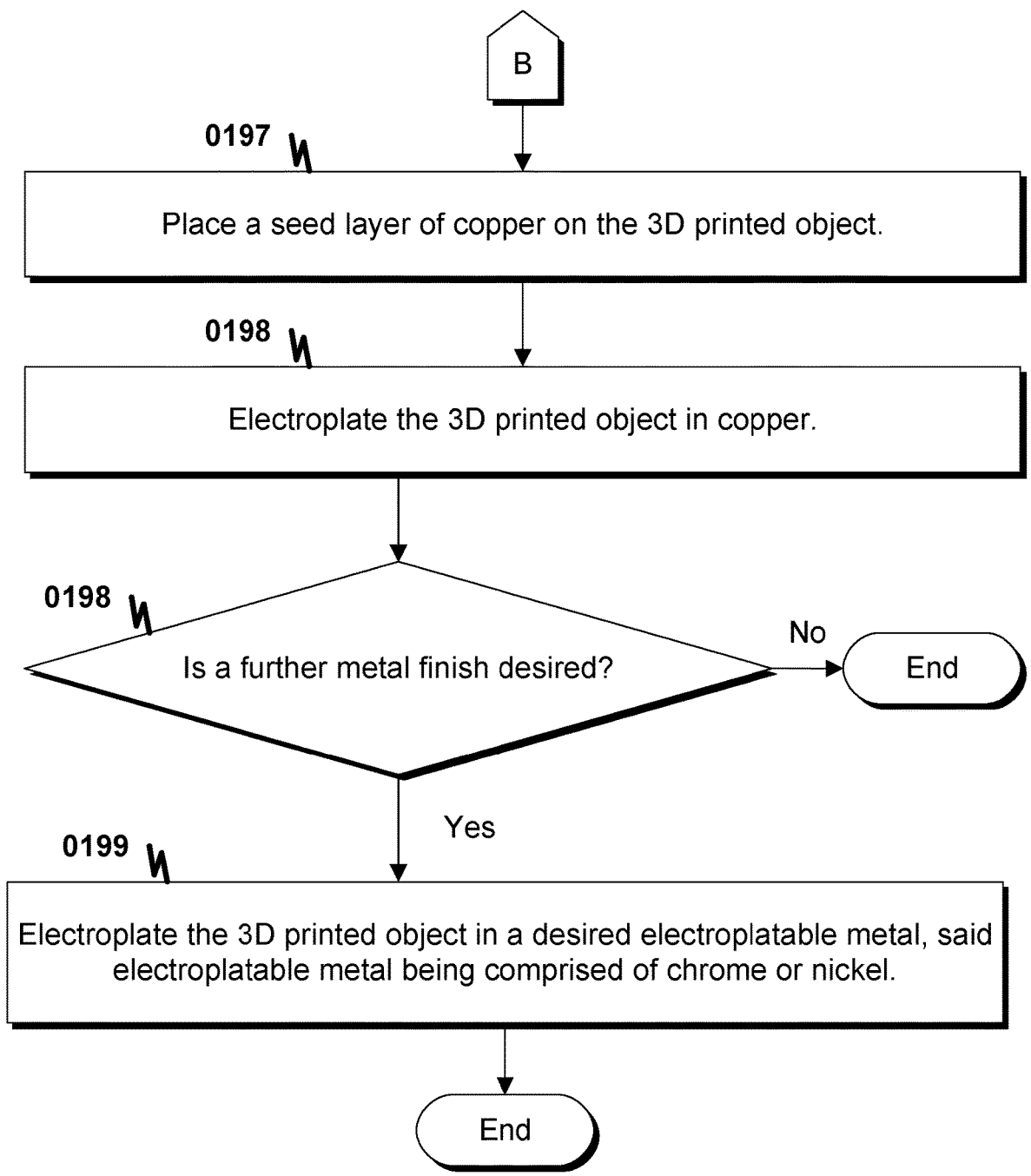
FIG. 18 is the third page of a multi-page flowchart showing steps in the process described in the eleventh exemplary embodiment.
Figure 19:
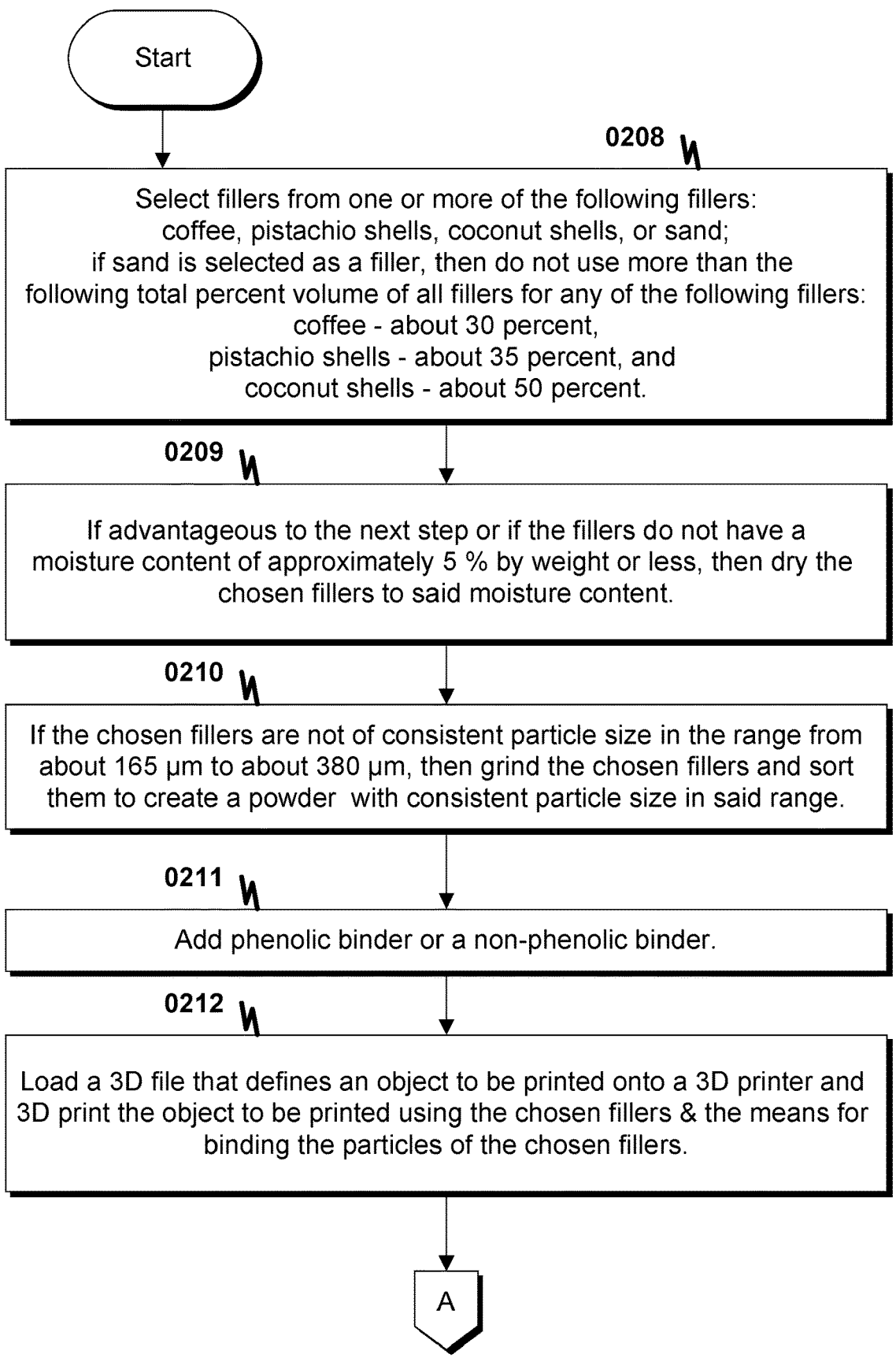
FIG. 19 is the first page of a multi-page flowchart showing steps in the process described in the twelfth exemplary embodiment for coffee cups by process of 3D printing bio-plastic made from one or more fillers of coffee, pistachio shells, coconut shells, or sand.
Figure 20:
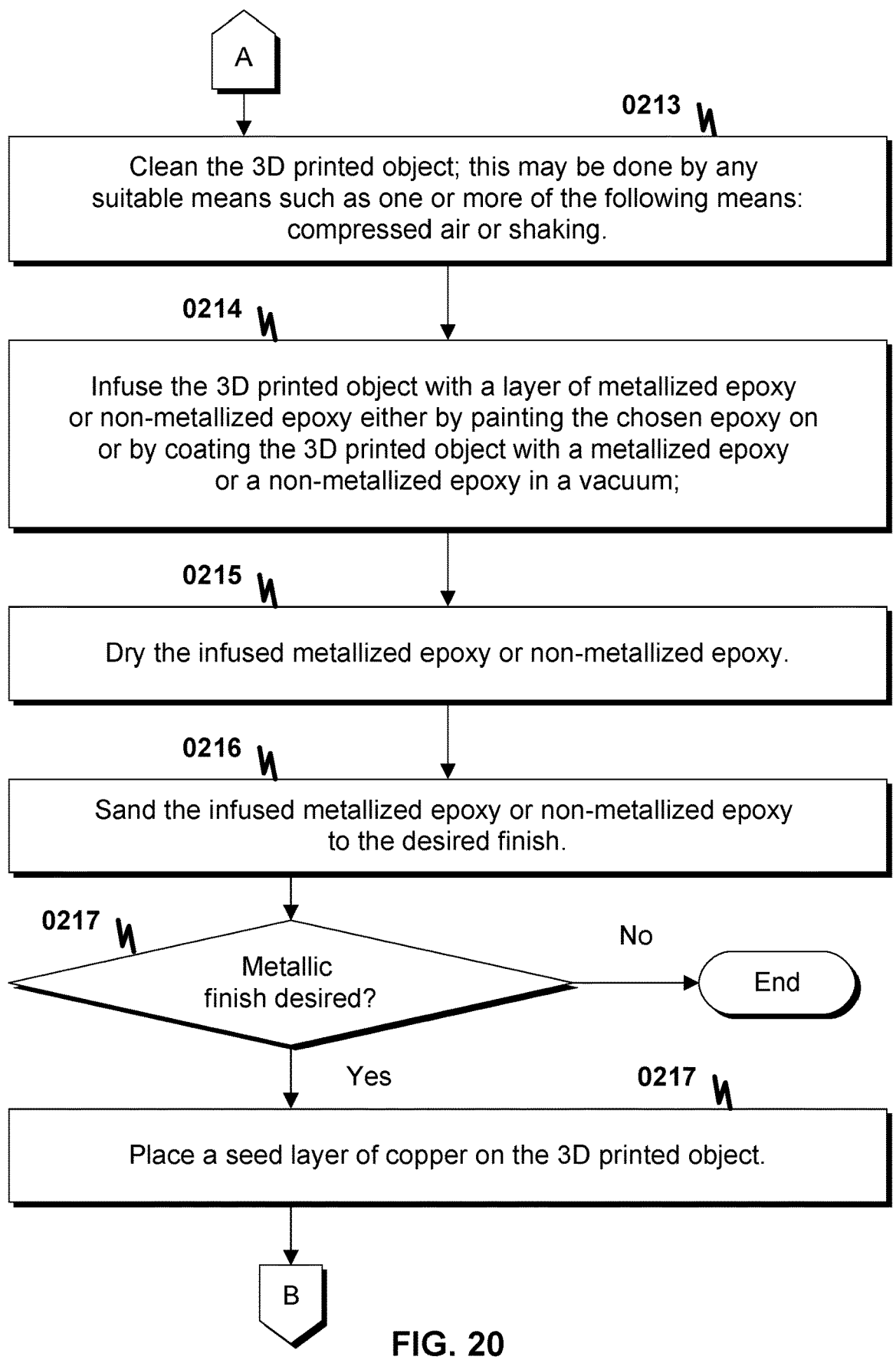
FIG. 20 is the second page of a multi-page flowchart showing steps in the process described in the twelfth exemplary embodiment.

The following exemplary embodiments are intended to provide further description of the invention so as to enable a person of ordinary skill in the art to make and use the full scope of the invention. They are not intended to be limiting. Further, in every embodiment where an enzyme-producing bacteria is chosen to bind to the chosen fillers as part of the 3D printing process, any preceding step that requires drying the filler (including to a specified moisture content) can be optionally omitted so long as the grinding step can be performed in its absence. That is because, as disclosed herein, the enzyme-producing bacteria require moisture to grow. In addition, where any preferred range or percentage is disclosed as part of any process or system in the embodiments below, they are intended to be approximate as well as only to reflect the range or percentage that has been found to be optimal at the present time.

First Exemplary Embodiment: A Process for Using Enzyme-Producing Bacteria to Bind and Harden 3D Printed Compositions that Use a Filler The disclosed process results in the formation of a natural cement produced with *Sporosarcina Pasteurii*, which is a common, nonpathogenic, soil bacterium that can induce the production of calcite through a chemical reaction. The result is a hardened material formed in a process referred to by Stocks Fischer as microbial induced calcite precipitation ("MICP").

MICP can be induced by creating a mixture comprising enzyme-producing bacteria, such as *Sporosarcina Pasteurii*, a nitrogen source, such as coffee grounds or urea; a food source, which can be the filler itself if the filler has the qualities of a food source for the enzyme-producing bacteria; and a source of calcium, such as oyster shells or calcium chloride. MICP will result in the formation of calcium carbonate to create a solid structure, layer, or shield around the 3D printed item. In order for MICP to successfully harden and bind the 3D printed filler, the enzyme-producing bacteria should be sufficiently well attached to at least one portion of the mixture, i.e., a substrate, so that subsequent processing in an aqueous environment does not materially move the bacteria and does not kill the majority of the bacteria before they are able to produce calcium carbonate and the calcium carbonate hardens.

The disclosed process comprises the following steps:
Step 1: Obtain one or more fillers to use in a 3D printer;
Step 2: Choose a means for binding enzyme-producing bacteria to the chosen fillers, and then add the means for binding to the particles of the chosen fillers, said means for binding the enzyme-producing bacteria to the chosen fillers being one or more inulin-rich materials or starch-rich materials;
Step 3: Create a 3D printing composition by adding the following to the mixture of the particles of the chosen fillers and the means for binding enzyme-producing bacteria to the chosen fillers:
one or more bacteria-based binders;
one or more food sources for the bacteria-based binders, said food source may be the filler itself, if the filler has the qualities of a food source for the enzyme-producing bacteria;
one or more nitrogen sources for the bacteria-based binders;
one or more calcium sources for the bacteria-based binders;
Step 4: Load a 3D file that defines an object to be printed onto a 3D printer and 3D print the object to be printed using the 3D printing composition; and
Step 5: Keep the resulting 3D printed item moist until the natural cement hardening time has elapsed.

The filler or fillers used in Step 1 can be one or more organic substrates and any combination of such substrates, such as one or more of the following, coffee, pistachio shells or coconut shells.

Products produced by the process described in this exemplary embodiment do not possess scents of coffee, pistachios, coconuts or any other organic substrate.

Sinks, toilets, faucets, coffee mug molds, lighting fixtures and coffee cups are among the products that can be produced by the disclosed process.

A person of ordinary skill in the art will appreciate that, although the foregoing process has been described with respect to sinks, toilets, faucets, coffee mug molds, lighting fixtures and coffee cups, the foregoing process is also suitable to other products and home fixtures. Such products are by way of example only and the foregoing process is suitable not only to the production of such durable home goods, but is equally suitable to a variety of durable goods and consumer products.

Second Exemplary Embodiment: A Process for Using Coffee, Pistachio Shells, Coconut Shells, Sand, or Combinations Thereof, as Fillers in 3D Printing A 3D printing process is disclosed that uses a filler, wherein the filler comprises one or more of the following materials: coffee, pistachio shells, coconut shells, sand, or a combination of one or more of the foregoing; trace amounts of carbon can also be used if electrical conductivity is desired as a characteristic of the final 3D printed product.

The disclosed process for using coffee, pistachio shells, coconut shells, sand, or combinations thereof, as fillers in 3D printing, comprises the following steps:
Step 1: Obtain fillers wherein the fillers are comprised of one or more of the following: coffee, pistachio shells, coconut shells, or sand,
where the volumes of said fillers may be as follows:
if sand is used as a filler then:
coffee constitutes not more than about 30 percent of the volume of all fillers;
pistachio shells constitute not more than about 35 percent of the volume of all fillers;
coconut shells constitute not more than about 50 percent of the volume of all fillers;
if sand is not used as a filler:
coffee may constitute any amount of the volume of all fillers;
pistachio shells may constitute any amount of the volume of all fillers;
coconut shells may constitute any amount of the volume of all fillers;
Step 2: If advantageous to Step 3 or if the chosen fillers do not have a moisture content of approximately 5% by weight or less, then dry the chosen fillers to said moisture content;
Step 3: If the chosen fillers are not of consistent particle size in the range from about 165 μm to about 380 μm, then grind the chosen fillers and sort the resulting particles to create a powder of the chosen fillers with consistent particle size in said range;
Step 4: Select a means for binding the dried particles of the chosen fillers in a 3D printer, said means for binding comprising one or more of the following: a furan binder, a silicate binder, a phenolic binder, or a lignin sulfonate binder; and
Step 5: Load a 3D file that defines an object to be printed onto a 3D printer and 3D print the object to be printed using the 3D printing composition.

The maximum volume percentages of coffee, pistachio shells and coconut shells recited above as fillers when sand is a filler may be important. If the amounts of coffee, pistachio shells or coconut shells are substantially greater than the maximum amounts specified, the disclosed process will not work as efficiently. Exceeding the maximum volume percentages of coffee, pistachio shells, and coconut shells recited above has been found to increase the likelihood of the denser particles settling out, thereby creating undesirable material banding and non-uniform layering of the various fillers when they are used in a 3D printer to 3D print an object. Non-uniform layering can result in more fragile and lower quality 3D printed objects that may require manual labor to correct post-printing. However, if the maximum volume percentages of coffee, pistachio shells, and coconut shells recited above are used when sand is a filler, the resulting mixture is more likely to contain an acceptable ratio of relative particle weights of the various constituent fillers that will avoid the problems of material banding, non-uniform layering and fragility that would otherwise be encountered.

Products produced by the process described in this exemplary embodiment do not possess scents of coffee, pistachios, or coconuts.

Sinks, toilets, faucets, coffee mug molds, lighting fixtures and coffee cups are among the products that can be produced by the disclosed process.

The chosen fillers that are to be 3D printed should have a moisture content of approximately 5% by weight or less; the ideal range of moisture content is 0.05%-0.30% of the chosen fillers by weight.

A person of ordinary skill in the art will appreciate that, although the foregoing process has been described with respect to sinks, toilets, faucets, coffee mug molds, lighting fixtures and coffee cups, the foregoing process is also suitable to other products and home fixtures. Such products are by way of example only and the foregoing process is suitable not only to the production of such durable home goods, but is equally suitable to a variety of durable goods and consumer products.

Third Exemplary Embodiment: A Process for Plating or Covering Products that are Comprised of Coffee, Pistachio Shells, Coconut Shells, Organic Substrates and any Combination Thereof A process is disclosed for plating or covering with metal products that are comprised of coffee, pistachio shells, coconut shells, organic substrates and any combination of the foregoing, said process comprising the following steps:
Step 1: Clean the 3D printed object; this may be done by any suitable means such as one or more of the following means: using compressed air or shaking;
Step 2: Infuse the 3D printed object with a layer of metallized epoxy or non-metallized epoxy either by painting the chosen epoxy on or by coating the 3D printed object with a metallized epoxy or a non-metallized epoxy in a vacuum;
Step 3: Dry the infused metallized epoxy or non-metallized epoxy;
Step 4: Sand the infused metallized epoxy or non-metallized epoxy to the desired finish;
Step 5: Place a seed layer of copper on the 3D printed object;
Step 6: Electroplate the 3D printed object in copper; if no further plating is desired, then end the process; otherwise proceed to the following step;
Step 7: Select another electroplatable metal which is desired as a plating and electroplate the 3D printed object in the selected electroplatable metal or an alloy thereof.

Products produced using the process described in this exemplary embodiment do not possess scents of coffee, pistachios, coconuts or organic substrates.

Sinks, toilets, faucets, coffee mug molds, lighting fixtures and coffee cups are examples of products that can be plated or covered using the disclosed process.

A person of ordinary skill in the art will appreciate that, although the foregoing process has been described with respect to sinks, toilets, faucets, coffee mug molds, lighting fixtures and coffee cups, the foregoing process is also suitable to other products and home fixtures. Such products are by way of example only and the foregoing process is suitable not only to the production of such durable home goods, but is equally suitable to a variety of durable goods and consumer products.

Fourth Exemplary Embodiment: A Process for Plating or Covering Products that are Comprised of Coffee, Pistachio Shells, Coconut Shells, Organic Substrates and any Combination Thereof Products comprised of coffee, pistachio shells, coconut shells, organic substrates and any combination thereof can be plated or covered using physical vapor deposition or atomic vapor deposition, said process comprising the following steps:
Step 1: Clean the product; this may be done by any suitable means such as one or more of the following means: using compressed air or shaking;
Step 2: Treat the product using a means for plating, such as one or more of the following: physical vapor deposition or atomic layer deposition, using said means to plate the product with a desired metal or metals, said metal or metals being comprised of one or more of the following: copper, chrome, nickel or an alloy that is comprised of any of them.

Products produced using the process described in this exemplary embodiment do not possess scents of coffee, pistachios, coconuts or organic substrates.

Sinks, toilets, faucets, coffee mug molds, lighting fixtures and coffee cups are examples of products that can be plated or covered using the disclosed process.

A person of ordinary skill in the art will appreciate that, although the foregoing process has been described with respect to sinks, toilets, faucets, coffee mug molds, lighting fixtures and coffee cups, the foregoing process is also suitable to other products and home fixtures. Such products are by way of example only and the foregoing process is suitable not only to the production of such durable home goods, but is equally suitable to a variety of durable goods and consumer products.

Fifth Exemplary Embodiment: A Process for Using Enzyme-Producing Bacteria to Bind and Harden 3D Printed Compositions Comprising One or More of the Following Fillers: Coffee, Pistachio Shells, Coconut Shells, Sand or Other Organic Substrates A 3D printing process is disclosed that uses a filler, wherein the filler comprises one or more of the following materials: coffee, pistachio shells, coconut shells, sand, or a combination of one or more of the foregoing; trace amounts of carbon can also be used if electrical conductivity is desired as a characteristic of the final 3D printed product. This process employs an enzyme-producing bacteria ("bacteria-based binder") as a binding agent in an inulin-rich or starch-rich environment. The 3D item that is produced as a result of this process is then kept moist for the natural cement hardening time and then the 3D printed item can be directly powder coated or electroplated, as desired.

The disclosed process results in the formation of a natural cement produced with *Sporosarcina Pasteurii*, which is a common, nonpathogenic, soil bacterium that can induce the production of calcite through a chemical reaction. The result is a hardened material formed in a process referred to in the First Embodiment above as "MICP."

MICP can be induced by creating a mixture comprising enzyme-producing bacteria, such as *Sporosarcina Pasteurii*, a nitrogen source, such as coffee grounds or urea; a food source, which can be the filler itself if the filler has the qualities of a food source for the enzyme-producing bacteria; and a source of calcium, such as oyster shells or calcium chloride. MICP will result in the formation of calcium carbonate to create a solid structure, layer, or shield around the 3D printed item. In order for MICP to successfully harden and bind the 3D printed filler, the enzyme-producing bacteria should be sufficiently well attached to at least one portion of the mixture, i.e., a substrate, so that subsequent processing in an aqueous environment does not materially move the bacteria and does not kill the majority of the bacteria before they are able to produce calcium carbonate and the calcium carbonate hardens.

An example of this disclosed process comprises the following steps:

Step 1: Obtain fillers wherein the fillers are comprised of one or more of the following: coffee, pistachio shells, coconut shells, or sand,
  where the volumes of said fillers may be as follows:
  if sand is used as a filler then:
    coffee constitutes not more than about 30 percent of the volume of all fillers;
    pistachio shells constitute not more than about 35 percent of the volume of all fillers;
    coconut shells constitute not more than about 50 percent of the volume of all fillers;
  if sand is not used as a filler:
    coffee may constitute any amount of the volume of all fillers;
    pistachio shells may constitute any amount of the volume of all fillers;
    coconut shells may constitute any amount of the volume of all fillers;

Step 2: As the binder in this example is an enzyme-producing bacteria, drying the chosen fillers is not advantageous unless drying may be required by or advantageous to the performance of Step 3, below; if drying is performed, the chosen fillers should have a moisture content of approximately 5% by weight or less;

Step 3: If the chosen fillers are not of consistent particle size in the range from about 165 μm to about 380 μm, then grind the chosen fillers and sort the resulting particles to create a powder of the chosen fillers with consistent particle size in said range;

Step 4: Choose a means for binding enzyme-producing bacteria to the chosen fillers, and then add the means for binding to the particles of the chosen fillers, said means for binding the enzyme-producing bacteria to the chosen fillers being one or more inulin-rich materials or starch-rich materials;

Step 5: Create a 3D printing composition by adding the following to the mixture of the particles of the chosen fillers and the means for binding enzyme-producing bacteria to the chosen fillers:
  one or more bacteria-based binders;
  one or more food sources for the bacteria-based binders, said food source may be the filler itself, if the filler has the qualities of a food source for the enzyme-producing bacteria;
  one or more nitrogen sources for the bacteria-based binders;
  one or more calcium sources for the bacteria-based binders;

Step 6: Load a 3D file that defines an object to be printed onto a 3D printer and 3D print the object to be printed using the 3D printing composition;

Step 7: Keep the resulting 3D printed item moist until the natural cement hardening time has elapsed.

Step 8: If it is desirable to metallize the 3D printed object, then treat the 3D printed object using physical vapor deposition, atomic layer deposition, or other suitable means, to add a desired metal or metals, said metal or metals being comprised of one or more of the following: copper, chrome, or nickel.

The maximum volume percentages of coffee, pistachio shells and coconut shells recited above as fillers when sand is a filler may be important. If the amounts of coffee, pistachio shells or coconut shells are substantially greater than the maximum amounts specified, the disclosed process will not work as efficiently. Exceeding the maximum volume percentages of coffee, pistachio shells, and coconut shells recited above has been found to increase the likelihood of the denser particles settling out, thereby creating undesirable material banding and non-uniform layering of the various fillers when they are used in a 3D printer to 3D print an object. Non-uniform layering can result in more fragile and lower quality 3D printed objects that may require manual labor to correct post-printing. However, if the maximum volume percentages of coffee, pistachio shells, and coconut shells recited above are used when sand is a filler, the resulting mixture is more likely to contain an acceptable ratio of relative particle weights of the various constituent fillers that will avoid the problems of material banding, non-uniform layering and fragility that would otherwise be encountered.

If sand is not used as a filler, then any organic substrate suitable for 3D printing, or combination of such organic substrates, can be used in Step 1 and may constitute any amount of the volume of all fillers.

Products produced by the process described in this exemplary embodiment do not possess scents of coffee, pistachios, coconuts or any organic substrate suitable for 3D printing.

Trace amounts of carbon can also be added to the filler prior to 3D printing if electrical conductivity is desired as a characteristic of the final 3D printed product.

Figure 21:
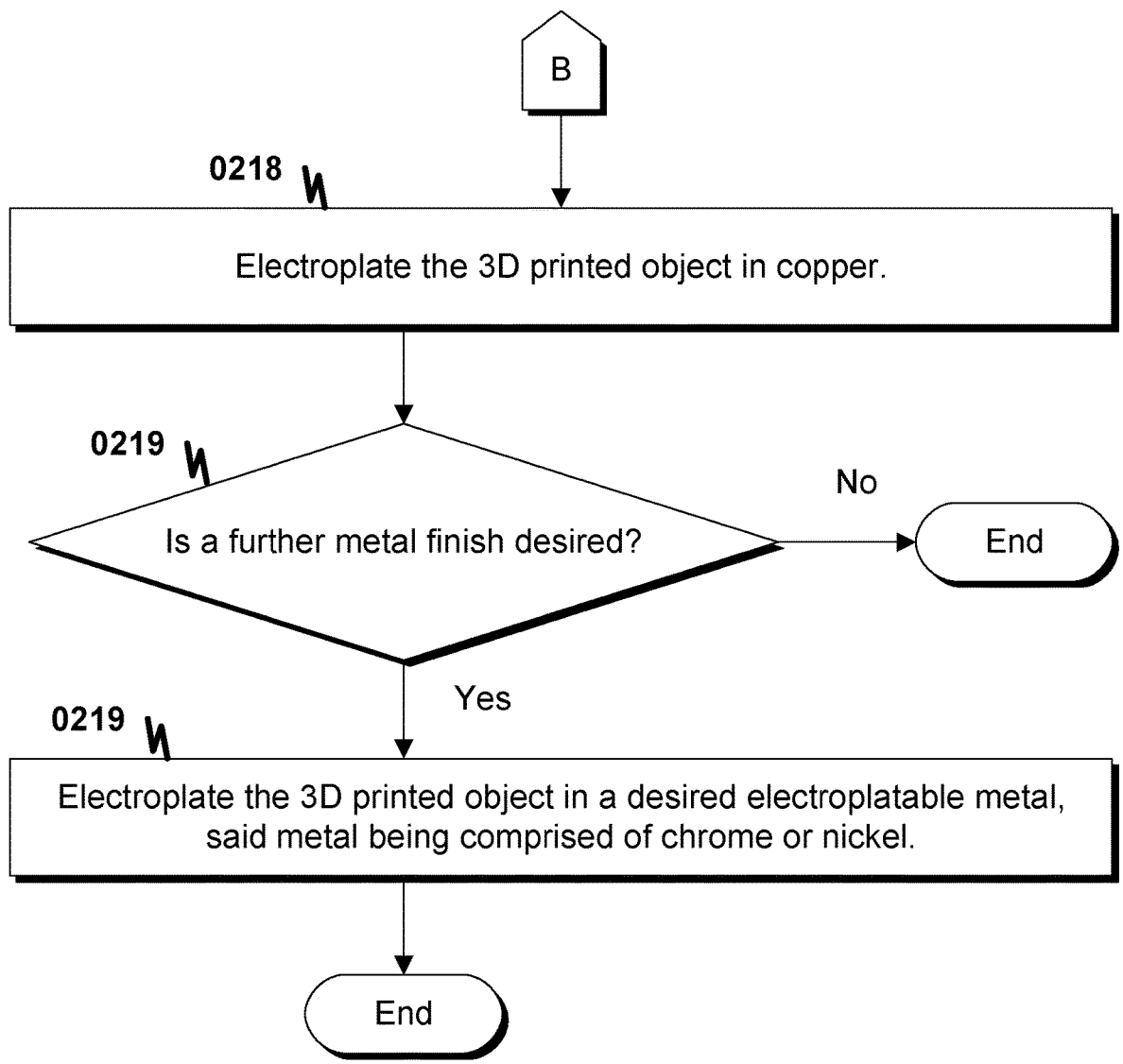
FIG. 21 is the third page of a multi-page flowchart showing steps in the process described in the twelfth exemplary embodiment.
Figure 22:
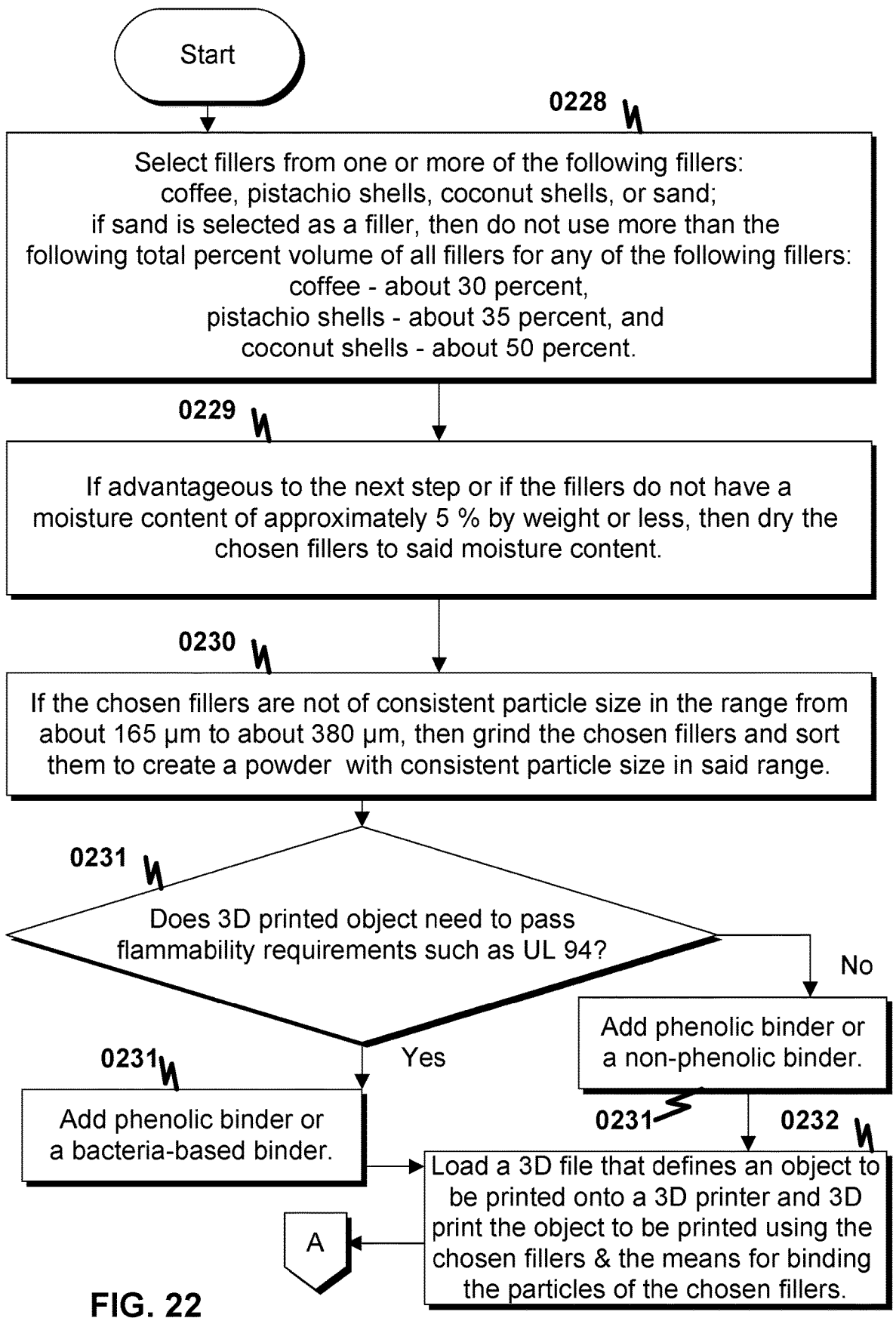
FIG. 22 is the first page of a multi-page flowchart showing steps in the process described in the thirteenth exemplary embodiment for a process of powder coating a bio-plastic made from one or more fillers of coffee, pistachio shells, coconut shells, or sand.
Figure 23:
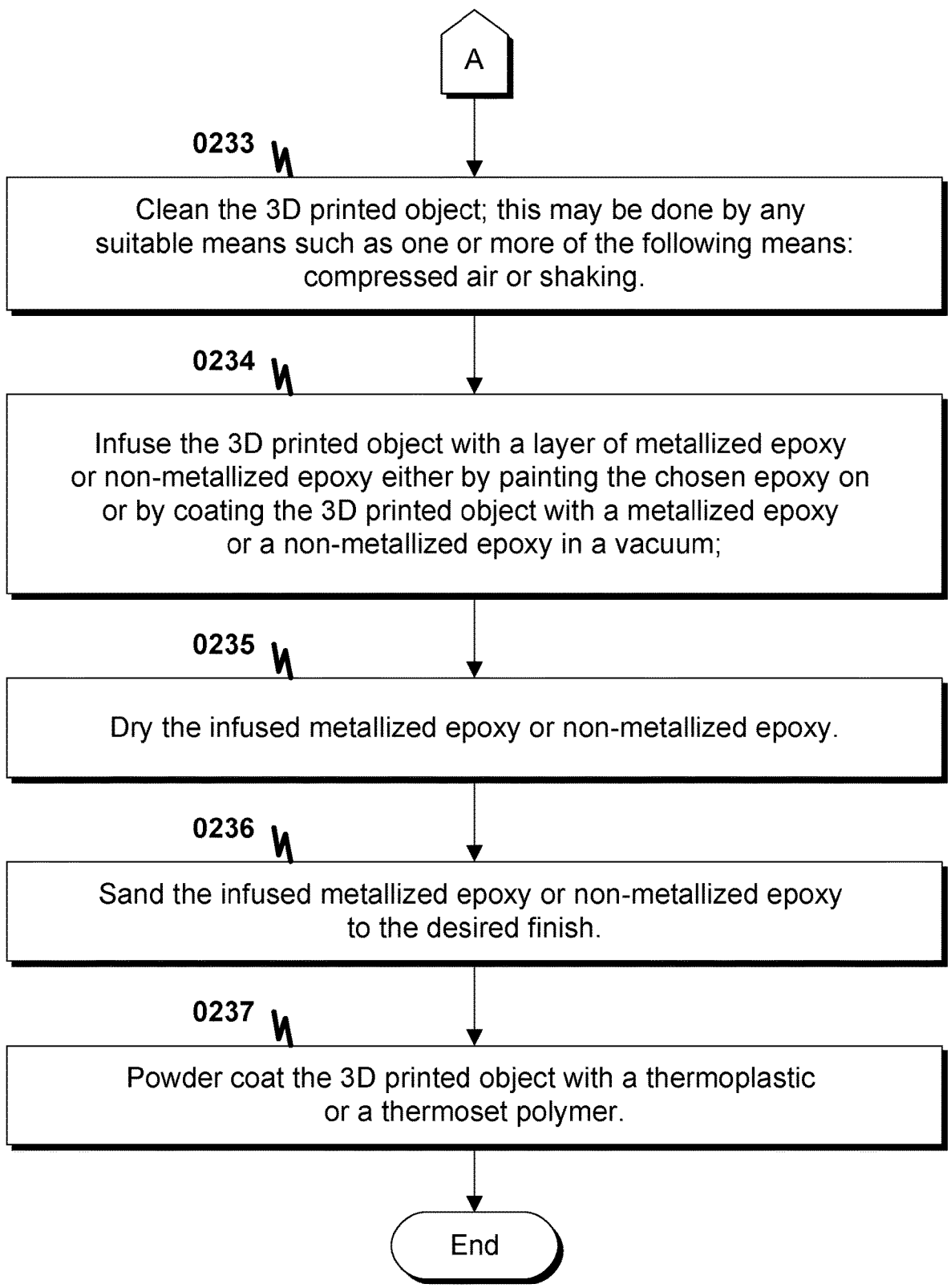
FIG. 23 is the second page of a multi-page flowchart showing steps in the process described in the thirteenth exemplary embodiment.
Figure 24:
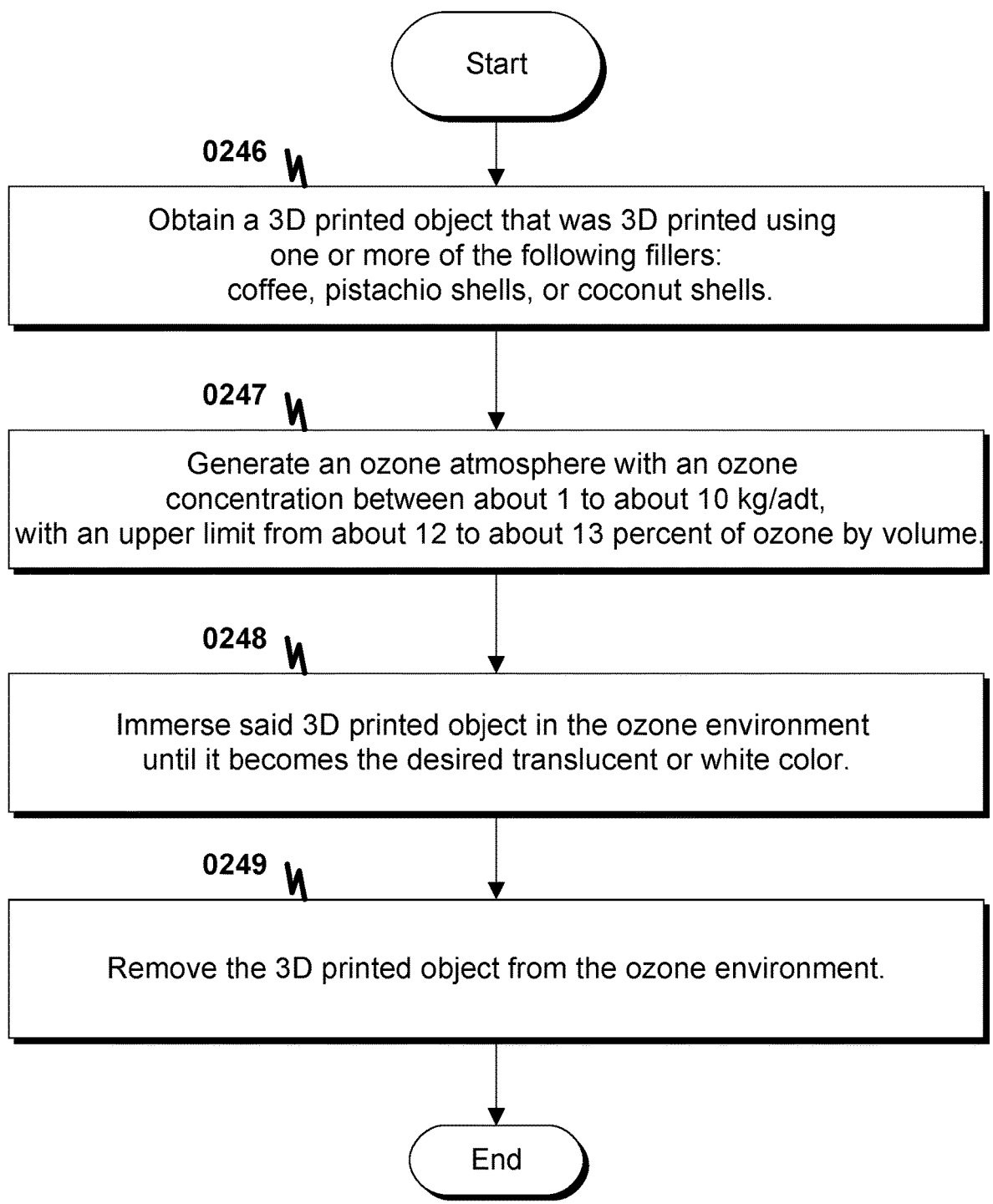
FIG. 24 is a flowchart showing steps in the process described in the fourteenth exemplary embodiment for a color treatment process for using ozone to change the color of 3D printed bio-plastic made from one or more fillers of coffee, pistachio shells, or coconut shells, to translucent or white.
Figure 25:
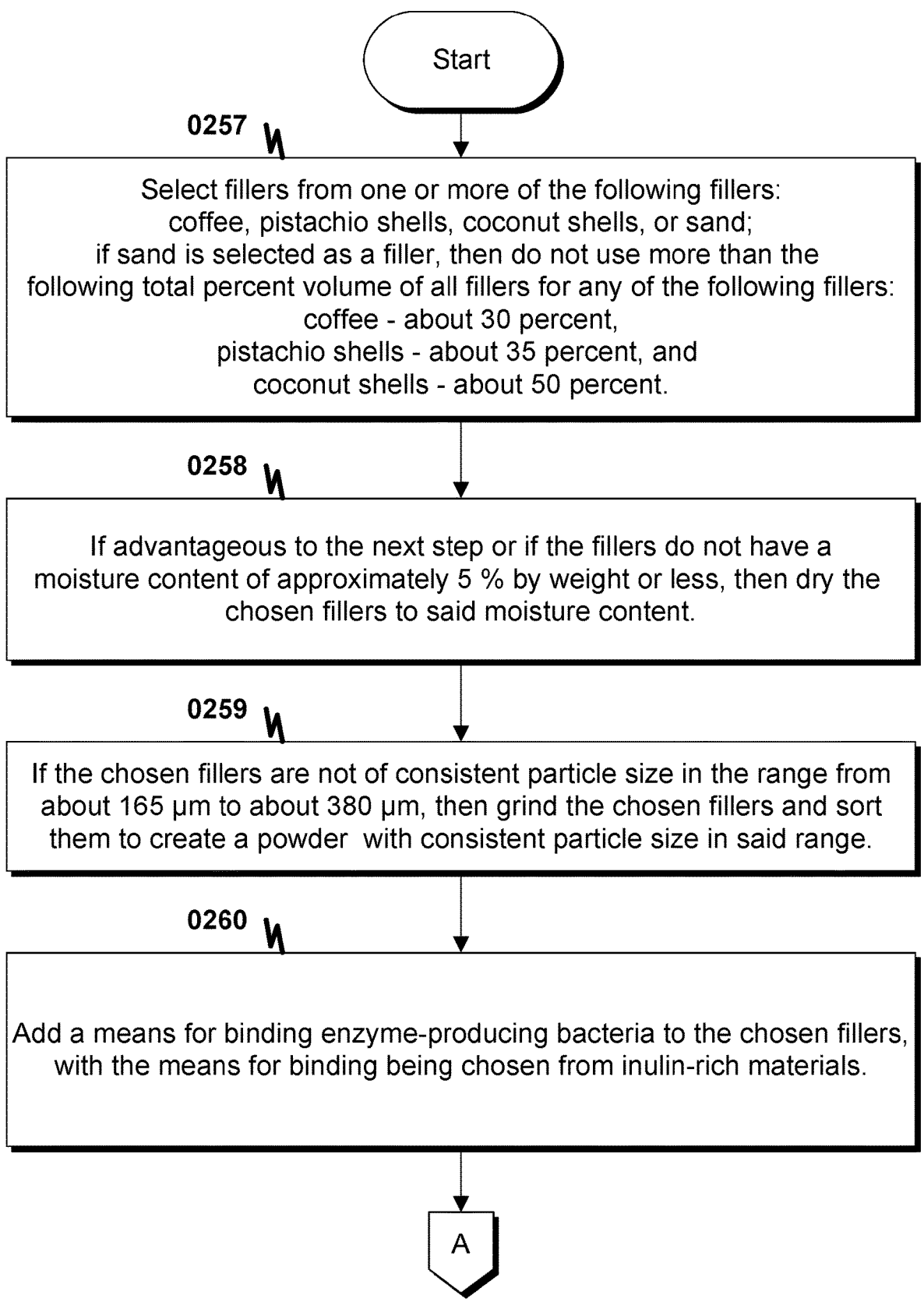
FIG. 25 is the first page of a multi-page flowchart showing steps in the process described in the fifteenth exemplary embodiment for a process for binding and hardening coffee, pistachio shells and coconut shells with sand in 3D printing in an environmentally friendly manner using enzyme-producing bacteria to produce calcium carbonate.
Figure 26:
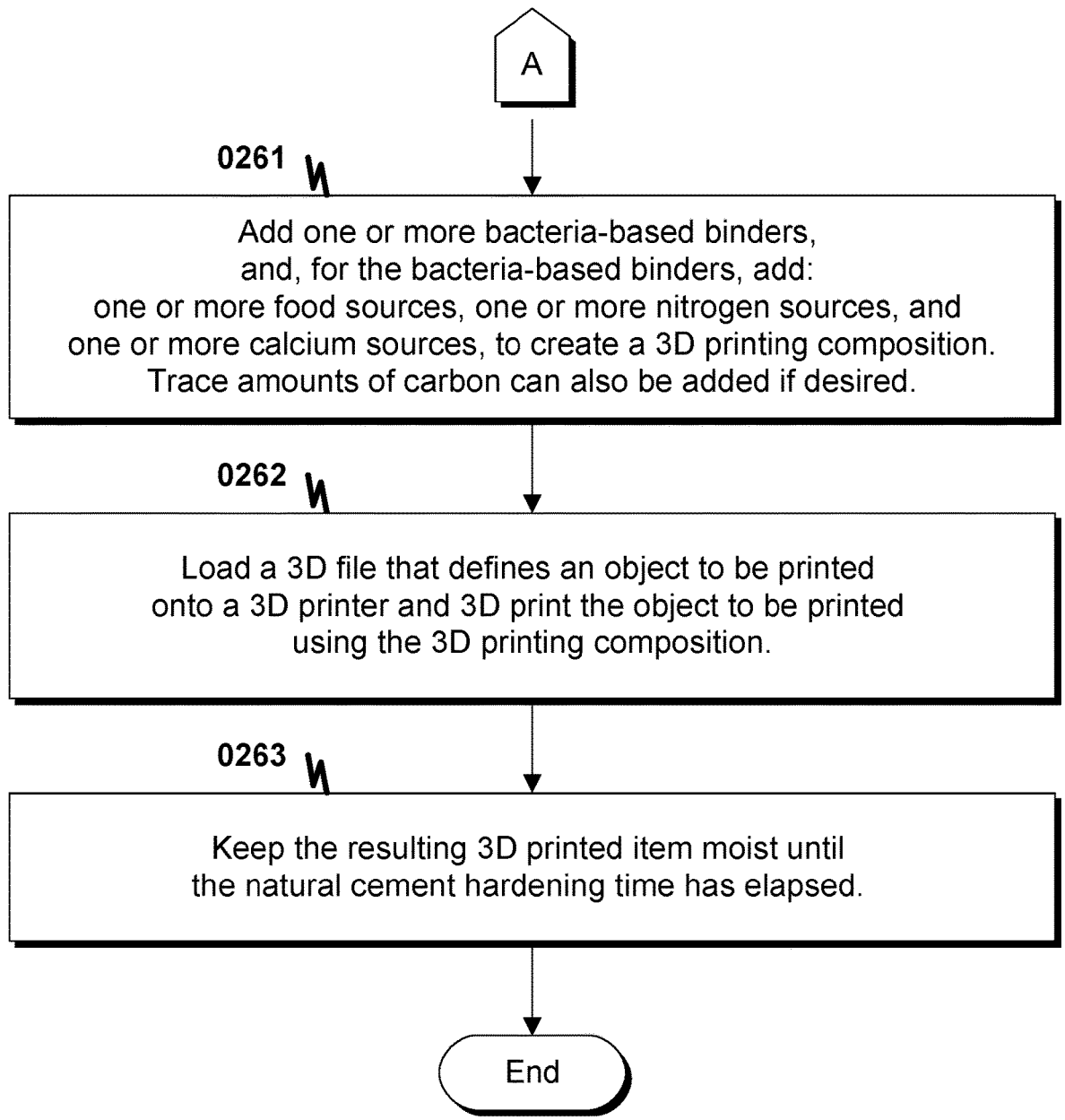
FIG. 26 is the second page of a multi-page flowchart showing steps in the process described in the fifteenth exemplary embodiment.
Figure 27:
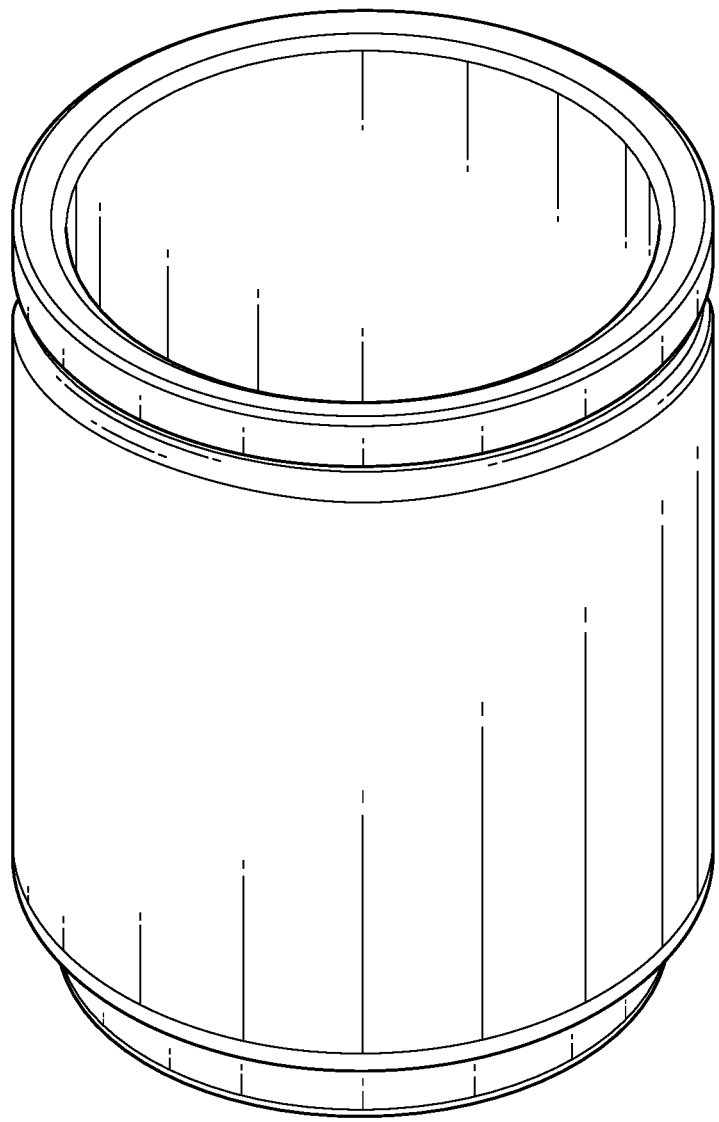
FIG. 27 is a front top perspective view of a coffee cup produced by a disclosed process.
Figure 28:
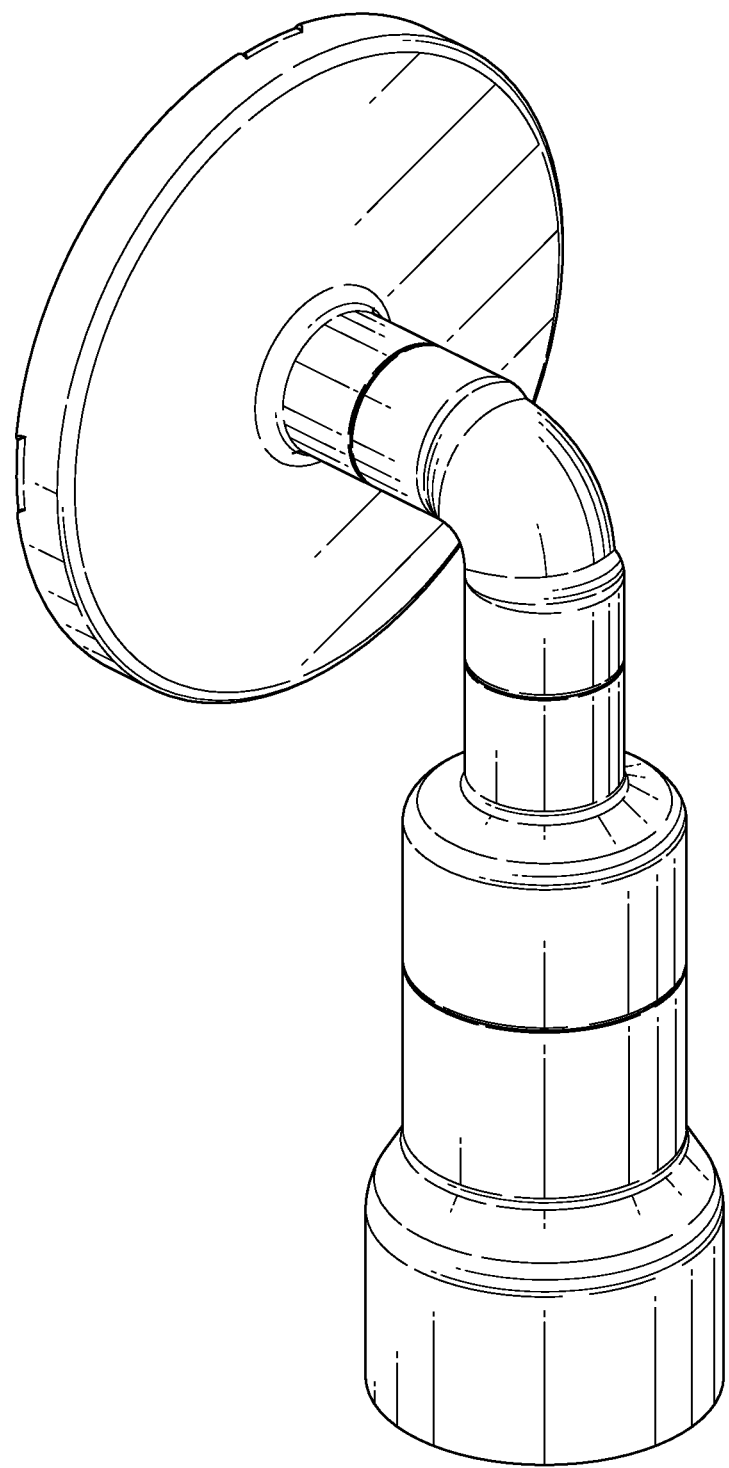
FIG. 28 is a left front upper perspective view of a lighting fixture produced by a disclosed process.

Sinks, toilets, faucets, coffee mug molds, lighting fixtures and coffee cups are among the products that can be produced by the disclosed process. FIG. 21 is a front top perspective view of an exemplary embodiment of a coffee cup produced by the disclosed process and FIG. 22 is a left front upper perspective view of an exemplary embodiment of a lighting fixture produced by the disclosed process.

The chosen fillers that are to be 3D printed should have a moisture content of approximately 5% by weight or less; the ideal range of moisture content is 0.05%-0.30% of the chosen fillers by weight.

A person of ordinary skill in the art will appreciate that, although the foregoing process has been described with respect to sinks, toilets, faucets, coffee mug molds, lighting fixtures and coffee cups, the foregoing process is also suitable to other products and home fixtures. Such products are by way of example only and the foregoing process is suitable not only to the production of such durable home goods, but is equally suitable to a variety of durable goods and consumer products.

Sixth Exemplary Embodiment: Bio-Plastic 3D Printing Material Comprising One or More Fillers of Coffee, Pistachio Shells, Coconut Shells, Sand, or Carbon A composition of matter is disclosed that is a bio-plastic comprised of coffee, pistachio shells, coconut shells, and sand which can be used with binder jetting technology in a 3D printer, such as a 3D printer manufactured by ExOne, Voxeljet, or Tongtai Machine & Tool Co., Ltd. Although various types of coffees have distinctive aromas, the disclosed composition of matter is without the scent associated with coffee when 3D printed via the disclosed process. Similarly, the disclosed composition has no aroma of pistachio shells, coconut shells or sand.

The disclosed composition of matter for use in a 3D printer may be comprised of the following:
particles that are approximately 165-380 µm in diameter chosen from one or more of the following fillers: coffee, pistachio shells, coconut shells, or sand;
where the volumes of said fillers may be as follows:
   if sand is used as a filler then:
      coffee constitutes not more than about 30 percent of the volume of all fillers;
      pistachio shells constitute not more than about 35 percent of the volume of all fillers;
      coconut shells constitute not more than about 50 percent of the volume of all fillers;
   if sand is not used as a filler:
      coffee may constitute any amount of the volume of all fillers;
      pistachio shells may constitute any amount of the volume of all fillers;
      coconut shells may constitute any amount of the volume of all fillers; and
a composition for binding the selected particles in a 3D printer, said composition for binding comprising, for example, one or more of the following: a bacteria-based binder, a furan binder, a silicate binder, a phenolic binder, or a lignin sulfonate binder.

Calcium lignosulfonate can be an acceptable lignin sulfonate binder because it is a relatively weak binder that can hold all of the 3D printing materials claimed in this application together long enough to apply a conductive coating, such as a metallized epoxy. Such a conductive coating is useful because it allows the coated product to subsequently be either powder coated or electroplated. It is possible to use powder coating to create a non-conductive surface.

Those skilled in the art of 3D printing will be acquainted with examples of furan binders, silicate binders, and phenolic binders and how these binding methods are used in the 3D printing process and thus further description of these is unnecessary for one of ordinary skill in the art to be able to comprehend and practice the disclosed technology as claimed. In addition, the bacteria-based binders described herein may be used.

As an example of how the particles described above could be formed, either a Nauta brand conical screw vacuum dryer, an Across International brand AT09.110.UL Ai Accutemp Vacuum Oven, or a fluid bed dryer could be used to dry the particles; an iPharmachine brand xzs Powder Sifter Machine could be used to custom screen the size of the particles desired, and either a Stedman Up & Down Hammer Mill or an iPharmachine brand super fine automatic continuous powder grinder could be used to grind coffee grounds if the coffee grounds are too big after the first round of sorting. Sensors such as a MoistTech Corp. brand IR3000 On-Line Sensor or a Hydronix brand Hydro-Probe can be used to determine whether the particles have been dried to the desired level of moisture content.

The maximum volume percentages of coffee, pistachio shells and coconut shells recited above as fillers when sand is a filler may be important. If the amounts of coffee, pistachio shells or coconut shells are substantially greater than the maximum amounts specified, the disclosed process will not work as efficiently. Exceeding the maximum volume percentages of coffee, pistachio shells, and coconut shells recited above has been found to increase the likelihood of the denser particles settling out, thereby creating undesirable material banding and non-uniform layering of the various fillers when they are used in a 3D printer to 3D print an object. Non-uniform layering can result in more fragile and lower quality 3D printed objects that may require manual labor to correct post-printing. However, if the maximum volume percentages of coffee, pistachio shells, and coconut shells recited above are used when sand is a filler, the resulting mixture is more likely to contain an acceptable ratio of relative particle weights of the various constituent fillers that will avoid the problems of material banding, non-uniform layering and fragility that would otherwise be encountered.

If sand is not used as a filler, then any organic substrate suitable for 3D printing, or combination of such substrates, can be used in Step 1 and may constitute any amount of the volume of all fillers.

Products produced by the process described in this exemplary embodiment do not possess scents of coffee, pistachios or coconuts.

Trace amounts of carbon can also be added to the filler prior to 3D printing if electrical conductivity is desired as a characteristic of the final 3D printed product.

Sinks, toilets, faucets, coffee mug molds, lighting fixtures and coffee cups are examples of products that can be 3D printed from the disclosed composition of matter.

A person of ordinary skill in the art will appreciate that, although the foregoing process has been described with respect to sinks, toilets, faucets, coffee mug molds, lighting fixtures and coffee cups, the foregoing process is also suitable to other products and home fixtures. Such products are by way of example only and the foregoing process is suitable not only to the production of such durable home goods, but is equally suitable to a variety of durable goods and consumer products.

Seventh Exemplary Embodiment: A Process for Creating Bio-Plastic 3D Printing Material from One or More Fillers of Coffee, Pistachio Shells, Coconut Shells, or Sand, when Flammability is Irrelevant A process is disclosed for creating bio-plastic 3D printing material from materials comprising coffee, pistachio shells, coconut shells, sand, and combinations thereof for use in a 3D printer in situations where it is irrelevant whether the 3D printing material is flammable.

Step 1: Obtain fillers wherein the fillers are comprised of one or more of the following: coffee, pistachio shells, coconut shells, or sand,
where the volumes of said fillers may be as follows:
if sand is used as a filler then:
coffee constitutes not more than about 30 percent of the volume of all fillers;
pistachio shells constitute not more than about 35 percent of the volume of all fillers;
coconut shells constitute not more than about 50 percent of the volume of all fillers;
if sand is not used as a filler:
coffee may constitute any amount of the volume of all fillers;
pistachio shells may constitute any amount of the coconut shells may constitute any amount of the volume of all fillers;

Step 2: If advantageous to Step 3 or if the chosen fillers do not have a moisture content of approximately 5% by weight or less, then dry the chosen fillers to said moisture content;

Step 3: If the chosen fillers are not of consistent particle size in the range from about 165 µm to about 380 µm, then grind the chosen fillers and sort the resulting particles to create a powder of the chosen fillers with consistent particle size in said range;

Step 4: Select a means for binding the dried particles of the chosen fillers in a 3D printer, said means for binding comprising one or more of the following: a bacteria-based binder, a furan binder, a silicate binder, a phenolic binder, or a lignin sulfonate binder; and Step 5: Load a 3D file that defines an object to be printed onto a 3D printer and 3D print the object to be printed using the 3D printing composition.

As to Step 2, if it is necessary to dry the filler to meet any of the parameters stated in Step 2, drying can be accomplished using a conventional oven or other suitable means. Moisture determination and measurement can be accomplished by measuring the moisture content after a period of drying, using a moisture meter such as a Derox brand moisture meter for sand, a MoistureTech Corp. brand IR-3000 moisture transmitter, or a Hydronix brand moisture sensor. Drying could alternatively also be accomplished by using a Nautica brand conical screw dryer, or by using an Across International brand Vacuum Oven with 5 Sided Heating.

As to Step 3, the grinding can be accomplished using a machine such as a Stedman brand general hammer mill or an Ipharmachine brand super fine automatic powder grinder machine YF2-1; the sorting can be accomplished using a machine such as an Ipharmachine brand powder sifter machine XZS-600.

The maximum volume percentages of coffee, pistachio shells and coconut shells recited above as fillers when sand is a filler may be important. If the amounts of coffee, pistachio shells or coconut shells are substantially greater than the maximum amounts specified, the disclosed process will not work as efficiently. Exceeding the maximum volume percentages of coffee, pistachio shells, and coconut shells recited above has been found to increase the likelihood of the denser particles settling out, thereby creating undesirable material banding and non-uniform layering of the various fillers when they are used in a 3D printer to 3D print an object. Non-uniform layering can result in more fragile and lower quality 3D printed objects that may require manual labor to correct post-printing. However, if the maximum volume percentages of coffee, pistachio shells, and coconut shells recited above are used when sand is a filler, the resulting mixture is more likely to contain an acceptable ratio of relative particle weights of the various constituent fillers that will avoid the problems of material banding, non-uniform layering and fragility that would otherwise be encountered.

If sand is not used as a filler, then any organic substrate suitable for 3D printing, or combination of such substrates, can be used in Step 1 and may constitute any amount of the volume of all fillers.

Products produced by the process described in this exemplary embodiment do not possess scents of coffee, pistachios or coconuts.

Trace amounts of carbon can also be added to the filler prior to 3D printing if electrical conductivity is desired as a characteristic of the final 3D printed product.

Sinks, toilets, faucets, coffee mug molds, lighting fixtures and coffee cups are among the products that can be produced by the disclosed process.

The chosen fillers that are to be 3D printed should have a moisture content of approximately 5% by weight or less; the ideal range of moisture content is 0.05%-0.30% of the chosen fillers by weight.

A person of ordinary skill in the art will appreciate that, although the foregoing process has been described with respect to sinks, toilets, faucets, coffee mug molds, lighting fixtures and coffee cups, the foregoing process is also suitable to other products and home fixtures. Such products are by way of example only and the foregoing process is suitable not only to the production of such durable home goods, but is equally suitable to a variety of durable goods and consumer products.

Eighth Exemplary Embodiment: A Process for Creating Non-Flammable Bio-Plastic 3D Printing Material from One or More Fillers of Coffee, Pistachio Shells, Coconut Shells, or Sand In certain instances, it may be either necessary or desirable to be able to create or use non-flammable bio-plastic 3D printing material. For example, if creating a lighting fixture, it may be necessary to comply with Underwriters Laboratories Standard UL 94, "Standard for Tests for Flammability of Plastic Materials for Parts in Devices and Appliances." In such cases, it is industrially useful to know how to make non-flammable bio-plastic 3D printing material.

A process is disclosed for creating non-flammable bio-plastic 3D printing material for use in a 3D printer from one or more of the following materials: coffee, pistachio shells, coconut shells, or sand.

Step 1: Obtain fillers wherein the fillers are comprised of one or more of the following: coffee, pistachio shells, coconut shells, or sand,
where the volumes of said fillers may be as follows:
if sand is used as a filler then:
coffee constitutes not more than about 30 percent of the volume of all fillers;
pistachio shells constitute not more than about 35 percent of the volume of all fillers;
coconut shells constitute not more than about 50 percent of the volume of all fillers;
if sand is not used as a filler:
coffee may constitute any amount of the volume of all fillers;

pistachio shells may constitute any amount of the volume of all fillers;
coconut shells may constitute any amount of the volume of all fillers;

Step 2: If advantageous to Step 3 or if the chosen fillers do not have a moisture content of approximately 5% by weight or less, then dry the chosen fillers to said moisture content;

Step 3: If the chosen fillers are not of consistent particle size in the range from about 165 μm to about 380 μm, then grind the chosen fillers and sort the resulting particles to create a powder of the chosen fillers with consistent particle size in said range;

Step 4: Select a phenolic binder or a bacteria-based binder for use as a means for binding the particles of the chosen fillers during the 3D printing process; and Step 5: Load a 3D file that defines an object to be printed onto a 3D printer and 3D print the object to be printed using the 3D printing composition.

The maximum volume percentages of coffee, pistachio shells and coconut shells recited above as fillers when sand is a filler may be important. If the amounts of coffee, pistachio shells or coconut shells are substantially greater than the maximum amounts specified, the disclosed process will not work as efficiently. Exceeding the maximum volume percentages of coffee, pistachio shells, and coconut shells recited above has been found to increase the likelihood of the denser particles settling out, thereby creating undesirable material banding and non-uniform layering of the various fillers when they are used in a 3D printer to 3D print an object. Non-uniform layering can result in more fragile and lower quality 3D printed objects that may require manual labor to correct post-printing. However, if the maximum volume percentages of coffee, pistachio shells, and coconut shells recited above are used when sand is a filler, the resulting mixture is more likely to contain an acceptable ratio of relative particle weights of the various constituent fillers that will avoid the problems of material banding, non-uniform layering and fragility that would otherwise be encountered.

If sand is not used as a filler, then any organic substrate suitable for 3D printing, or combination of such substrates, can be used in Step 1 and may constitute any amount of the volume of all fillers.

Products produced by the process described in this exemplary embodiment do not possess scents of coffee, pistachios or coconuts.

Trace amounts of carbon can also be added to the filler prior to 3D printing if electrical conductivity is desired as a characteristic of the final 3D printed product.

Sinks, toilets, faucets, coffee mug molds, lighting fixtures and coffee cups are among the products that can be produced by the disclosed process.

The chosen fillers that are to be 3D printed should have a moisture content of approximately 5% by weight or less; the ideal range of moisture content is 0.05%-0.30% of the chosen fillers by weight.

A person of ordinary skill in the art will appreciate that, although the foregoing process has been described with respect to sinks, toilets, faucets, coffee mug molds, lighting fixtures and coffee cups, the foregoing process is also suitable to other products and home fixtures. Such products are by way of example only and the foregoing process is suitable not only to the production of such durable home goods, but is equally suitable to a variety of durable goods and consumer products.

Ninth Exemplary Embodiment: A Process of Copper Electroplating Bio-Plastics Made from One or More Fillers of Coffee, Pistachio Shells, Coconut Shells, or Sand A process is disclosed that can be used to create a copper finish on a bio-plastic. Although the disclosed process is discussed within the context of 3D printed bio-plastics that are made from one or more of coffee, pistachio shells, coconut shells, or sand, the process would be equally applicable to any coffee-based bio-plastic, irrespective of whether the coffee-based bio-plastic was formed by 3D printing or by some other process.

Step 1: Obtain fillers wherein the fillers are comprised of one or more of the following: coffee, pistachio shells, coconut shells, or sand,
where the volumes of said fillers may be as follows:
if sand is used as a filler then:
coffee constitutes not more than about 30 percent of the volume of all fillers;
pistachio shells constitute not more than about 35 percent of the volume of all fillers;
coconut shells constitute not more than about 50 percent of the volume of all fillers;
if sand is not used as a filler:
coffee may constitute any amount of the volume of all fillers;
pistachio shells may constitute any amount of the volume of all fillers;
coconut shells may constitute any amount of the volume of all fillers;

Step 2: If advantageous to Step 3 or if the chosen fillers do not have a moisture content of approximately 5% by weight or less, then dry the chosen fillers to said moisture content;

Step 3: If the chosen fillers are not of consistent particle size in the range from about 165 μm to about 380 μm, then grind the chosen fillers and sort the resulting particles to create a powder of the chosen fillers with consistent particle size in said range;

Step 4: Choose a means for binding and then add the means for binding to the particles of the chosen fillers; if non-flammability is desired, choose a bacteria-based binder or a phenolic binder; if flammability is irrelevant, select one or more of a non-phenolic or a phenolic binder for use as a means for binding the particles of the chosen fillers during the 3D printing process, said non-phenolic binder comprising one or more of a bacteria-based binder, a furan binder, a silicate binder, or a lignin sulfonate binder;

Step 5: Load a 3D file that defines an object to be printed onto a 3D printer and 3D print the object to be printed using the chosen fillers and the means for binding the particles of the chosen fillers;

Step 6: Clean the 3D printed object; this may be done by any suitable means such as one or more of the following means: using compressed air or shaking;

Step 7: Infuse the 3D printed object with a layer of metallized epoxy or non-metallized epoxy either by painting the chosen epoxy on or by coating the 3D printed object with a metallized epoxy or a non-metallized epoxy in a vacuum;

Step 8: Dry the infused metallized epoxy or non-metallized epoxy;

Step 9: Sand the infused metallized epoxy or non-metallized epoxy to the desired finish;

Step 10: Place a seed layer of copper on the 3D printed object; and

Step 11: Electroplate the 3D printed object in copper.

As to Step 7, the epoxy coating referred to in that step may be applied by brushing it on to the 3D printed object or by dipping the 3D printed object into the epoxy. A pool of epoxy is left at the bottom of the part when the vacuum is set; this is done so that the epoxy will wick up into the 3D printed object.

As to Step 9, the epoxy referred to in that step may be sanded by hand using sandpaper, by sandblasting, or by tumbling in a machine, such as a rotary or vibratory tumbler.

The maximum volume percentages of coffee, pistachio shells and coconut shells recited above as fillers when sand is a filler may be important. If the amounts of coffee, pistachio shells or coconut shells are substantially greater than the maximum amounts specified, the disclosed process will not work as efficiently. Exceeding the maximum volume percentages of coffee, pistachio shells, and coconut shells recited above has been found to increase the likelihood of the denser particles settling out, thereby creating undesirable material banding and non-uniform layering of the various fillers when they are used in a 3D printer to 3D print an object. Non-uniform layering can result in more fragile and lower quality 3D printed objects that may require manual labor to correct post-printing. However, if the maximum volume percentages of coffee, pistachio shells, and coconut shells recited above are used when sand is a filler, the resulting mixture is more likely to contain an acceptable ratio of relative particle weights of the various constituent fillers that will avoid the problems of material banding, non-uniform layering and fragility that would otherwise be encountered.

If sand is not used as a filler, then any organic substrate suitable for 3D printing, or combination of such substrates, can be used in Step 1 and may constitute any amount of the volume of all fillers.

Products produced by the process described in this exemplary embodiment do not possess scents of coffee, pistachios or coconuts.

Trace amounts of carbon can also be added to the filler prior to 3D printing if electrical conductivity is desired as a characteristic of the final 3D printed product.

Sinks, toilets, faucets, coffee mug molds, lighting fixtures and coffee cups are among the products that can be produced by the disclosed process.

The chosen fillers that are to be 3D printed should have a moisture content of approximately 5% by weight or less; the ideal range of moisture content is 0.05%-0.30% of the chosen fillers by weight.

A person of ordinary skill in the art will appreciate that, although the foregoing process has been described with respect to sinks, toilets, faucets, coffee mug molds, lighting fixtures and coffee cups, the foregoing process is also suitable to other products and home fixtures. Such products are by way of example only and the foregoing process is suitable not only to the production of such durable home goods, but is equally suitable to a variety of durable goods and consumer products.

Tenth Exemplary Embodiment: A Process of Chrome Electroplating Bio-Plastics Made from One or More Fillers of Coffee, Pistachio Shells, Coconut Shells, or Sand A process is disclosed that can be used to create a chrome finish on a bio-plastic made from one or more fillers of coffee, pistachio shells, coconut shells, or sand. Although the disclosed process is discussed within the context of a 3D printed bio-plastic, the process would be equally applicable to any bio-plastic made from one or more fillers of coffee, pistachio shells, coconut shells, or sand, irrespective of whether the bio-plastic was formed by 3D printing or by some other process.

Step 1: Obtain fillers wherein the fillers are comprised of one or more of the following: coffee, pistachio shells, coconut shells, or sand, where the volumes of said fillers may be as follows:

if sand is used as a filler then:

coffee constitutes not more than about 30 percent of the volume of all fillers;

pistachio shells constitute not more than about 35 percent of the volume of all fillers;

coconut shells constitute not more than about 50 percent of the volume of all fillers;

if sand is not used as a filler:

coffee may constitute any amount of the volume of all fillers;

pistachio shells may constitute any amount of the volume of all fillers;

coconut shells may constitute any amount of the volume of all fillers;

Step 2: If advantageous to Step 3 or if the chosen fillers do not have a moisture content of approximately 5% by weight or less, then dry the chosen fillers to said moisture content;

Step 3: If the chosen fillers are not of consistent particle size in the range from about 165 μm to about 380 μm, then grind the chosen fillers and sort the resulting particles to create a powder of the chosen fillers with consistent particle size in said range;

Step 4: Choose a means for binding and then add the means for binding to the particles of the chosen fillers; if non-flammability is desired, choose a bacteria-based binder or a phenolic binder; if flammability is irrelevant, select one or more of a non-phenolic or a phenolic binder for use as a means for binding the particles of the chosen fillers during the 3D printing process, said non-phenolic binder comprising one or more of a bacteria-based binder, a furan binder, a silicate binder, or a lignin sulfonate binder;

Step 5: Load a 3D file that defines an object to be printed onto a 3D printer and 3D print the object to be printed using the particles of the chosen fillers and the means for binding the particles of the chosen fillers;

Step 6: Clean the 3D printed object; this may be done by any suitable means such as one or more of the following means: using compressed air or shaking;

Step 7: Infuse the 3D printed object with a layer of metallized epoxy or non-metallized epoxy either by painting the chosen epoxy on or by coating the 3D printed object with a metallized epoxy or a non-metallized epoxy in a vacuum;

Step 8: Dry the infused metallized epoxy or non-metallized epoxy;

Step 9: Sand the infused metallized epoxy or non-metallized epoxy to the desired finish;

Step 10: Place a seed layer of copper on the 3D printed object;

Step 11: Electroplate the 3D printed object in copper; and

Step 12: Electroplate the 3D printed object in a desired electroplatable metal, said metals comprising metals such as chrome or nickel.

The maximum volume percentages of coffee, pistachio shells and coconut shells recited above as fillers when sand is a filler may be important. If the amounts of coffee, pistachio shells or coconut shells are substantially greater than the maximum amounts specified, the disclosed process will not work as efficiently. Exceeding the maximum volume percentages of coffee, pistachio shells, and coconut shells recited above has been found to increase the likelihood of the denser particles settling out, thereby creating undesirable material banding and non-uniform layering of the various fillers when they are used in a 3D printer to 3D print an object. Non-uniform layering can result in more fragile and lower quality 3D printed objects that may require manual labor to correct post-printing. However, if the maximum volume percentages of coffee, pistachio shells, and coconut shells recited above are used when sand is a filler, the resulting mixture is more likely to contain an acceptable ratio of relative particle weights of the various constituent fillers that will avoid the problems of material banding, non-uniform layering and fragility that would otherwise be encountered.

If sand is not used as a filler, then any organic substrate suitable for 3D printing, or combination of such substrates, can be used in Step 1 and may constitute any amount of the volume of all fillers.

Products produced by the process described in this exemplary embodiment do not possess scents of coffee, pistachios or coconuts.

Sinks, toilets, faucets, coffee mug molds, lighting fixtures and coffee cups are among the products that can be produced by the disclosed process.

The chosen fillers that are to be 3D printed should have a moisture content of approximately 5% by weight or less; the ideal range of moisture content is 0.05%-0.30% of the chosen fillers by weight.

A person of ordinary skill in the art will appreciate that, although the foregoing process has been described with respect to sinks, toilets, faucets, coffee mug molds, lighting fixtures and coffee cups, the foregoing process is also suitable to other products and home fixtures. Such products are by way of example only and the foregoing process is suitable not only to the production of such durable home goods, but is equally suitable to a variety of durable goods and consumer products.

Eleventh Exemplary Embodiment: Lighting Fixtures by Process of 3D Printing of Non-Flammable Bio-Plastic Made from One or More Fillers of Coffee, Pistachio Shells, Coconut Shells, or Sand Lighting fixtures comprised of non-flammable coffee-based bio-plastic can be created by process of 3D printing, by a process comprising the following steps:
Step 1: Obtain fillers wherein the fillers are comprised of one or more of the following: coffee, pistachio shells, coconut shells, or sand,
where the volumes of said fillers may be as follows:
if sand is used as a filler then:
coffee constitutes not more than about 30 percent of the volume of all fillers;
pistachio shells constitute not more than about 35 percent of the volume of all fillers;
coconut shells constitute not more than about 50 percent of the volume of all fillers;
if sand is not used as a filler:
coffee may constitute any amount of the volume of all fillers;
pistachio shells may constitute any amount of the volume of all fillers;
coconut shells may constitute any amount of the volume of all fillers;
Step 2: If advantageous to Step 3 or if the chosen fillers do not have a moisture content of approximately 5% by weight or less, then dry the chosen fillers to said moisture content;
Step 3: If the chosen fillers are not of consistent particle size in the range from about 165 μm to about 380 μm, then grind the chosen fillers and sort the resulting particles to create a powder of the chosen fillers with consistent particle size in said range;
Step 4: Choose a means for binding that is a bacteria-based binder or a phenolic binder and then add the means for binding to the particles of the chosen fillers;
Step 5: Load a 3D file that defines a lighting fixture to be printed onto a 3D printer and 3D print the lighting fixture using the particles of the chosen fillers and the means for binding the particles of the chosen fillers;
Step 6: Clean the 3D printed object; this may be done by any suitable means such as one or more of the following means: using compressed air or shaking;
Step 7: Infuse the 3D printed lighting fixture with a layer of metallized epoxy or with a non-metallized epoxy either by painting on the chosen epoxy or by coating the 3D printed lighting fixture with metallized epoxy or with non-metallized epoxy in a vacuum;
Step 8: Dry the infused metallized epoxy or non-metallized epoxy;
Step 9: Sand the infused metallized epoxy or non-metallized epoxy to the desired finish;
Step 10: If a metallic finish is desired, then place a seed layer of copper on the 3D printed lighting fixture; if no metallic finish is desired, then the process and the product are complete;
Step 11: Electroplate the 3D printed lighting fixture in copper; if no additional metallic finish is desired, then the process and the product are complete; and
Step 12: If a further metal finish is desired, then electroplate the 3D printed lighting fixture in a desired electroplatable metal, said electroplatable metal being comprised of chrome or nickel.

The maximum volume percentages of coffee, pistachio shells and coconut shells recited above as fillers when sand is a filler may be important. If the amounts of coffee, pistachio shells or coconut shells are substantially greater than the maximum amounts specified, the disclosed process will not work as efficiently. Exceeding the maximum volume percentages of coffee, pistachio shells, and coconut shells recited above has been found to increase the likelihood of the denser particles settling out, thereby creating undesirable material banding and non-uniform layering of the various fillers when they are used in a 3D printer to 3D print an object. Non-uniform layering can result in more fragile and lower quality 3D printed objects that may require manual labor to correct post-printing. However, if the maximum volume percentages of coffee, pistachio shells, and coconut shells recited above are used when sand is a filler, the resulting mixture is more likely to contain an acceptable ratio of relative particle weights of the various constituent fillers that will avoid the problems of material banding, non-uniform layering and fragility that would otherwise be encountered.

If sand is not used as a filler, then any organic substrate suitable for 3D printing, or combination of such substrates, can be used in Step 1 and may constitute any amount of the volume of all fillers.

Products produced by the process described in this exemplary embodiment do not possess scents of coffee, pistachios or coconuts.

Trace amounts of carbon can also be added to the filler prior to 3D printing if electrical conductivity is desired as a characteristic of the final 3D printed product.

Sinks, toilets, faucets, coffee mug molds, lighting fixtures and coffee cups are among the products that can be produced by the disclosed process.

The chosen fillers that are to be 3D printed should have a moisture content of approximately 5% by weight or less; the ideal range of moisture content is 0.05%-0.30% of the chosen fillers by weight.

A person of ordinary skill in the art will appreciate that, although the foregoing process has been described with respect to sinks, toilets, faucets, coffee mug molds, lighting fixtures and coffee cups, the foregoing process is also suitable to other products and home fixtures. Such products are by way of example only and the foregoing process is suitable not only to the production of such durable home goods, but is equally suitable to a variety of durable goods and consumer products.

Twelfth Exemplary Embodiment: Coffee Cups by Process of 3D Printing Bio-Plastic Made from One or More Fillers of Coffee, Pistachio Shells, Coconut Shells, or Sand Coffee cups comprised of non-flammable bio-plastic made from one or more fillers of coffee, pistachio shells, coconut shells, or sand can be created by a process of 3D printing that comprises the following steps:

Step 1: Obtain fillers wherein the fillers are comprised of one or more of the following: coffee, pistachio shells, coconut shells, or sand,
where the volumes of said fillers may be as follows:
if sand is used as a filler then:
coffee constitutes not more than about 30 percent of the volume of all fillers;
pistachio shells constitute not more than about 35 percent of the volume of all fillers;
coconut shells constitute not more than about 50 percent of the volume of all fillers;
if sand is not used as a filler:
coffee may constitute any amount of the volume of all fillers;
pistachio shells may constitute any amount of the volume of all fillers;
coconut shells may constitute any amount of the volume of all fillers;

Step 2: If advantageous to Step 3 or if the chosen fillers do not have a moisture content of approximately 5% by weight or less, then dry the chosen fillers to said moisture content;

Step 3: If the chosen fillers are not of consistent particle size in the range from about 165 μm to about 380 μm, then grind the chosen fillers and sort the resulting particles to create a powder of the chosen fillers with consistent particle size in said range;

Step 4: Choose a means for binding that is either a phenolic binder or a non-phenolic binder and then add the means for binding to the particles of the chosen fillers;

Step 5: Load a 3D file that defines a coffee cup to be printed onto a 3D printer and 3D print the coffee cup using the particles of the chosen fillers and the means for binding the particles of the chosen fillers;

Step 6: Clean the 3D printed object; this may be done by any suitable means such as one or more of the following means: using compressed air or shaking;

Step 7: Infuse the 3D printed coffee cup with a layer of metallized epoxy either by painting it on or by coating the 3D printed coffee cup with metallized epoxy in a vacuum;

Step 8: Dry the metallized epoxy;

Step 9: Sand the metallized epoxy to the desired finish;

Step 10: If a metallic finish is desired, then place a seed layer of copper on the 3D printed lighting fixture; if no metallic finish is desired, then the process and the product are complete;

Step 11: Electroplate the 3D printed coffee cup in copper; if no additional metallic finish is desired, then the process and the product are complete; and Step 12: If a further metal finish is desired, then electroplate the 3D printed coffee cup in a desired electroplatable metal, said metal being comprised of chrome or nickel.

The maximum volume percentages of coffee, pistachio shells and coconut shells recited above as fillers when sand is a filler may be important. If the amounts of coffee, pistachio shells or coconut shells are substantially greater than the maximum amounts specified, the disclosed process will not work as efficiently. Exceeding the maximum volume percentages of coffee, pistachio shells, and coconut shells recited above has been found to increase the likelihood of the denser particles settling out, thereby creating undesirable material banding and non-uniform layering of the various fillers when they are used in a 3D printer to 3D print an object. Non-uniform layering can result in more fragile and lower quality 3D printed objects that may require manual labor to correct post-printing. However, if the maximum volume percentages of coffee, pistachio shells, and coconut shells recited above are used when sand is a filler, the resulting mixture is more likely to contain an acceptable ratio of relative particle weights of the various constituent fillers that will avoid the problems of material banding, non-uniform layering and fragility that would otherwise be encountered.

If sand is not used as a filler, then any organic substrate suitable for 3D printing, or combination of such substrates, can be used in Step 1 and may constitute any amount of the volume of all fillers.

Products produced by the process described in this exemplary embodiment do not possess scents of coffee, pistachios or coconuts.

Trace amounts of carbon can also be added to the filler prior to 3D printing if electrical conductivity is desired as a characteristic of the final 3D printed product.

Sinks, toilets, faucets, coffee mug molds, lighting fixtures and coffee cups are among the products that can be produced by the disclosed process.

The chosen fillers that are to be 3D printed should have a moisture content of approximately 5% by weight or less; the ideal range of moisture content is 0.05%-0.30% of the chosen fillers by weight.

A person of ordinary skill in the art will appreciate that, although the foregoing process has been described with respect to sinks, toilets, faucets, coffee mug molds, lighting fixtures and coffee cups, the foregoing process is also suitable to other products and home fixtures. Such products are by way of example only and the foregoing process is suitable not only to the production of such durable home goods, but is equally suitable to a variety of durable goods and consumer products.

Thirteenth Exemplary Embodiment: A Process of Powder Coating a Bio-Plastic Made from One or More Fillers of Coffee, Pistachio Shells, Coconut Shells, or Sand A process is disclosed that can be used to create a powder coat finish on a bio-plastic made from one or more fillers of coffee, pistachio shells, coconut shells, or sand. Although the disclosed process is discussed within the context of a 3D printed bio-plastic, the process would be equally applicable to any bio-plastic made from one or more fillers of coffee, pistachio shells, coconut shells, or sand, irrespective of whether the bio-plastic was formed by 3D printing or by some other process.

Step 1: Obtain fillers wherein the fillers are comprised of one or more of the following: coffee, pistachio shells, coconut shells, or sand,
where the volumes of said fillers may be as follows:
if sand is used as a filler then:
coffee constitutes not more than about 30 percent of the volume of all fillers;
pistachio shells constitute not more than about 35 percent of the volume of all fillers;
coconut shells constitute not more than about 50 percent of the volume of all fillers;
if sand is not used as a filler:
coffee may constitute any amount of the volume of all fillers;
pistachio shells may constitute any amount of the volume of all fillers;
coconut shells may constitute any amount of the volume of all fillers;

Step 2: If advantageous to Step 3 or if the chosen fillers do not have a moisture content of approximately 5% by weight or less, then dry the chosen fillers to said moisture content;

Step 3: If the chosen fillers are not of consistent particle size in the range from about 165 μm to about 380 μm, then grind the chosen fillers and sort the resulting particles to create a powder of the chosen fillers with consistent particle size in said range;

Step 4: Choose a means for binding and then add the means for binding to the particles of the chosen fillers; if non-flammability is desired, choose a bacteria-based binder or a phenolic binder; if flammability is irrelevant, select one or more of a non-phenolic or a phenolic binder for use as a means for binding the particles of the chosen fillers during the 3D printing process, said non-phenolic binder comprising one or more of a bacteria-based binder, a furan binder, a silicate binder, or a lignin sulfonate binder;

Step 5: Load a 3D file that defines an object to be printed onto a 3D printer and 3D print the object to be printed using the particles of the chosen fillers and the means for binding the particles of the chosen fillers;

Step 6: Clean the 3D printed object; this may be done by any suitable means such as one or more of the following means: using compressed air or shaking;

Step 7: Infuse the 3D printed lighting fixture with a layer of metallized epoxy or with a non-metallized epoxy either by painting on the chosen epoxy or by coating the 3D printed lighting fixture with metallized epoxy or with non-metallized epoxy in a vacuum;

Step 8: Dry the infused metallized epoxy or non-metallized epoxy;

Step 9: Sand the infused metallized epoxy or non-metallized epoxy to the desired finish; and Step 10: Powder coat the 3D printed object with a thermoplastic or a thermoset polymer.

The maximum volume percentages of coffee, pistachio shells and coconut shells recited above as fillers when sand is a filler may be important. If the amounts of coffee, pistachio shells or coconut shells are substantially greater than the maximum amounts specified, the disclosed process will not work as efficiently. Exceeding the maximum volume percentages of coffee, pistachio shells, and coconut shells recited above has been found to increase the likelihood of the denser particles settling out, thereby creating undesirable material banding and non-uniform layering of the various fillers when they are used in a 3D printer to 3D print an object. Non-uniform layering can result in more fragile and lower quality 3D printed objects that may require manual labor to correct post-printing. However, if the maximum volume percentages of coffee, pistachio shells, and coconut shells recited above are used when sand is a filler, the resulting mixture is more likely to contain an acceptable ratio of relative particle weights of the various constituent fillers that will avoid the problems of material banding, non-uniform layering and fragility that would otherwise be encountered.

If sand is not used as a filler, then any organic substrate suitable for 3D printing, or combination of such substrates, can be used in Step 1 and may constitute any amount of the volume of all fillers.

Products produced by the process described in this exemplary embodiment do not possess scents of coffee, pistachios or coconuts.

Sinks, toilets, faucets, coffee mug molds, lighting fixtures and coffee cups are among the products that can be produced by the disclosed process.

The chosen fillers that are to be 3D printed should have a moisture content of approximately 5% by weight or less; the ideal range of moisture content is 0.05%-0.30% of the chosen fillers by weight.

A person of ordinary skill in the art will appreciate that, although the foregoing process has been described with respect to sinks, toilets, faucets, coffee mug molds, lighting fixtures and coffee cups, the foregoing process is also suitable to other products and home fixtures. Such products are by way of example only and the foregoing process is suitable not only to the production of such durable home goods, but is equally suitable to a variety of durable goods and consumer products.

Fourteenth Exemplary Embodiment: A Color Treatment Process for Using Ozone to Change the Color of 3D Printed Bio-Plastic Made from One or More Fillers of Coffee, Pistachio Shells, or Coconut Shells, to Translucent or White This embodiment discloses a safe and environmentally friendly process of turning 3D printed materials made from one or more fillers of coffee, pistachio shells, or coconut shells, to translucent or white by using ozone.

Initially, the color treatment process may be applied to any 3D printed material that is 3D printed with materials made from one or more fillers of coffee, pistachio shells, or coconut shells to translucent or white by using ozone. The fillers may be present singly or in any combination with each other.

The following process may be used to treat a 3D printed object made from one or more fillers of coffee, pistachio shells, or coconut shells to make such a printed object translucent or white by using ozone:

Step 1: Generate an ozone atmosphere with an ozone concentration between about 1 to about 10 kg/adt, with an upper limit from about 12 to about 13 percent of ozone by volume; one or more means may be used to generate said ozone atmosphere, said means including corona discharge and the use of ultraviolet electromagnetic radiation; if ultraviolet electromagnetic radiation is used to create the ozone, then wavelengths from about 160 nanometers to about 380 nanometers should be used, with a pulse rate of about ten milliseconds or less;

Step 2: Immerse said 3D printed object in the ozone atmosphere created in Step 2 until it becomes the desired translucent or white color; and Step 3: Remove said 3D printed object from the ozone environment.

The use of UV that combines the wavelengths of 184.9 nm and 253.7 nm has the further salutary effect of neutralizing microbiological contaminants such as mold in materials such as coffee, pistachio shells, and coconut shells.

Sinks, toilets, faucets, coffee mug molds, lighting fixtures and coffee cups are among the products that can be treated by the disclosed process.

A person of ordinary skill in the art will appreciate that, although the foregoing process has been described with respect to sinks, toilets, faucets, coffee mug molds, lighting fixtures and coffee cups, the foregoing process is also suitable to other products and home fixtures. Such products are by way of example only and the foregoing process is suitable not only to the production of such durable home goods, but is equally suitable to a variety of durable goods and consumer products.

Fifteenth Exemplary Embodiment: A Process for Binding and Hardening Coffee, Pistachio Shells and Coconut Shells with Sand in 3D Printing in an Environmentally Friendly Manner Using Enzyme-Producing Bacteria to Produce Calcium Carbonate The goal of the disclosed process is to 3D print using bio-plastic made from one or more fillers of coffee, pistachio shells, or coconut shells as filler, to add trace amounts of graphite for conductivity and to bind all of the preceding together with enzyme-producing bacteria in an inulin-rich environment. If this is done and the resulting 3D printed item is kept moist for a few days, then the 3D printed item can be directly powder coated or electroplated as desired.

The result of this process is the formation of a form of natural cement produced with *Sporosarcina Pasteurii*, which is a common, nonpathogenic, soil bacterium that can induce the production of calcium carbonate through a chemical reaction. The result is a hardened material formed in a process referred to as MICP.

The creation of the MICP is accomplished by creating a mixture comprising enzyme-producing bacteria, such as *Sporosarcina Pasteurii*, a nitrogen source, such as urea; a food source, which can be the filler itself if the filler has the qualities of a food source for the enzyme-producing bacteria; and a source of calcium, such as calcium chloride. The calcium will ultimately contribute to the formation of calcium carbonate to create a solid structure, layer, or shield around the 3D printed item. The bacteria used should be sufficiently well attached to at least one portion of the mixture, i.e., a substrate, so that subsequent processing in an aqueous environment does not materially move the bacteria and does not kill the bacteria.

A process for binding and hardening coffee, pistachio shells and coconut shells with sand in 3D printing in an environmentally friendly manner using enzyme-producing bacteria to produce calcium carbonate, said process comprising the following steps:

Step 1: Obtain fillers wherein the fillers are comprised of one or more of the following: coffee, pistachio shells, coconut shells, or sand,
where the volumes of said fillers may be as follows:
if sand is used as a filler then:
coffee constitutes not more than about 30 percent of the volume of all fillers;
pistachio shells constitute not more than about 35 percent of the volume of all fillers;
coconut shells constitute not more than about 50 percent of the volume of all fillers;
if sand is not used as a filler:
coffee may constitute any amount of the volume of all fillers;
pistachio shells may constitute any amount of the volume of all fillers;
coconut shells may constitute any amount of the volume of all fillers;

Step 2: If advantageous to Step 3 or if the chosen fillers do not have a moisture content of approximately 5% by weight or less, then dry the chosen fillers to said moisture content;

Step 3: If the chosen fillers are not of consistent particle size in the range from about 165 μm to about 380 μm, then grind the chosen fillers and sort the resulting particles to create a powder of the chosen fillers with consistent particle size in said range;

Step 4: Choose a means for binding enzyme-producing bacteria to the chosen fillers and then add the means for binding to the particles of the chosen fillers, said means for binding being chosen from one or more inulin-rich materials: Jerusalem artichoke, sweet potato, oysterplant, leek, chicory (*Cichorium intybus*), artichoke, onion, garlic, shallot, elecampane (*Inula helenium*), and bananas;

Step 5: Add the following to the mixture of the particles of the chosen fillers and the means for binding: a food source, which can be the filler itself if the filler has the qualities of a food source for the enzyme-producing bacteria, and enzyme-producing bacteria selected from one or more organisms comprising the following class: *Sporosarcina Pasteurii, Sporosarcina Ureae, Proteus Vulgaris, Bacillus Sphaericus, Myxococcus Xanthus, Proteus Mirabilis, Helicobacter Pylori*; a nitrogen source, such as urea; and a source of calcium, such as calcium chloride;

Step 6: Load a 3D file that defines an object to be printed onto a 3D printer and 3D print the object to be printed using the particles of the chosen fillers and the means for binding the particles of the chosen fillers; and Step 7: Keep the resulting 3D printed item moist until the natural cement hardening time has elapsed.

The process of this embodiment can also be modified so that in Step 4 carbon is also added to the means for binding and the particles of the chosen fillers so that there is no need to hand coat a 3D printed object if it is desired to powder coat or electroplate said 3D printed item.

The maximum volume percentages of coffee, pistachio shells and coconut shells recited above as fillers when sand is a filler may be important. If the amounts of coffee, pistachio shells or coconut shells are substantially greater than the maximum amounts specified, the disclosed process will not work as efficiently. Exceeding the maximum volume percentages of coffee, pistachio shells, and coconut shells recited above has been found to increase the likelihood of the denser particles settling out, thereby creating undesirable material banding and non-uniform layering of the various fillers when they are used in a 3D printer to 3D print an object. Non-uniform layering can result in more fragile and lower quality 3D printed objects that may require manual labor to correct post-printing. However, if the maximum volume percentages of coffee, pistachio shells, and coconut shells recited above are used when sand is a filler, the resulting mixture is more likely to contain an acceptable ratio of relative particle weights of the various constituent fillers that will avoid the problems of material banding, non-uniform layering and fragility that would otherwise be encountered.

If sand is not used as a filler, then any organic substrate suitable for 3D printing, or combination of such substrates, can be used in Step 1 and may constitute any amount of the volume of all fillers.

Products produced by the process described in this exemplary embodiment do not possess scents of coffee, pistachios or coconuts.

Trace amounts of carbon can also be added to the filler prior to 3D printing if electrical conductivity is desired as a characteristic of the final 3D printed product.

Sinks, toilets, faucets, coffee mug molds, lighting fixtures and coffee cups are among the products that can be produced by the disclosed process.

The chosen fillers that are to be 3D printed should have a moisture content of approximately 5% by weight or less; the ideal range of moisture content is 0.05%-0.30% of the chosen fillers by weight.

A person of ordinary skill in the art will appreciate that, although the foregoing process has been described with respect to sinks, toilets, faucets, coffee mug molds, lighting fixtures and coffee cups, the foregoing process is also suitable to other products and home fixtures. Such products are by way of example only and the foregoing process is suitable not only to the production of such durable home goods, but is equally suitable to a variety of durable goods and consumer products.

Definitions

Certain definitions are provided below. At no time are any of these definitions intended to modify or restrict the knowledge of a person having ordinary skill in the art or to limit the scope of the claims unless such definition is expressly adopted in the claim language itself. Similarly, reference to particular examples within each definition are exemplary and non-limiting.

"adt" means air dry ton.

"Atomic layer deposition" means a controlled form of chemical vapor deposition that uses timed pulses of reactive precursors to encapsulate all exposed surfaces of a substrate for coating, wherein each pulse deposits a single self-terminating layer of the material to be deposited.

"Bacteria-based binder" means enzyme-producing bacteria that are capable of microbial induced calcite precipitation, including, for example, one or more of *Sporosarcina Pasteurii, Sporosarcina Ureae, Proteus Vulgaris, Bacillus Sphaericus, Myxococcus Xanthus, Proteus Mirabilis*, and *Helicobacter Pylori*.

"Calcium source" includes any composition of matter, such as calcium chloride, from which a bacteria-based binder can obtain bioavailable calcium.

"Carbon" comprises all stable allotropes of the element carbon, including graphite.

"Coconut shells" includes the hulls of coconuts, said hulls having been ground to powder.

"Coffee" may be comprised of coffee beans or coffee grounds, roasted or unroasted, including coffee grounds that have previously been used to make coffee. "Coffee" includes powder particles of any shape.

"Electroplatable metal" comprises any element on the periodic table of the elements (and alloys of said element) that conducts electricity at a temperature of absolute zero, but excludes such elements and alloys that are liquids or gases at 273 degrees Kelvin and one atmosphere of pressure, and excludes the elements classified as metalloids (Boron, Silicon, Germanium, Arsenic, Antimony, Tellerium and Astatine), noble gases (Helium, Neon, Argon, Krypton, Xenon and Radon), Hydrogen, Carbon, Nitrogen, Oxygen, Flourine, Phosphorous, Sulfur, Chlorine, Selenium, Bromine, Iodine, Meitnerium, Darmstadtium, Roentgenium, Nihonium, Moscovium, Livermorium, Tennessine and Oganesson. Applicant does not represent that it has electroplated using every one of the metals or alloys so defined, but believes based upon literature known to those skilled in the art that each of the metals and alloys thereof meeting this definition are capable of being electroplated; the use of all elements and alloys other than copper, chromium and nickel are prophetic examples.

"Food source" comprises carbohydrates (such as, but not limited to, sugar and corn), lipids (such as, but not limited to, those present in coffee), proteins (such as, but not limited to, those present in coffee), a nitrogen source and a calcium source that are bioavailable to enzyme-producing bacteria within a bacteria-based binder.

"Furan binder" includes a cold-curing furan resin used as a binder in the process of organic direct binding in a 3D printing process.

"Inulin-rich materials" comprises plant tissue that contains substantial amounts of inulin, such as one or more of Jerusalem artichoke, sweet potato, oyster plant, leek, chicory (*Cichorium intybus*), artichoke, onion, garlic, shallot, elecampane (*Inula helenium*), and banana.

"kg" means kilograms.

"Lignin sulfonate binder" includes, for example, lignin sulfonates chosen from the following class: lignin sulfonic acid, sodium salts, sodium lignosulfonate, magnesium lignosulfonate, ammonium lignosulfonate, and calcium lignosulfonate.

"MICP" means microbial induced calcite precipitation.

"Metallized epoxy" includes an epoxy that is comprised of one or more metals chosen from the following class: aluminum, steel, carbon, or graphite.

"Natural cement hardening time" may be approximately 3-5 days depending on the overall size and thickness of the product from the time of 3D printing. The identification of this date range is exemplary and not limiting, as a variety of factors may affect the natural cement hardening time.

"Nitrogen source" includes any composition of matter, such as urea, from which an enzyme-producing bacteria of a bacteria-based binder can obtain bioavailable nitrogen.

"Organic substrate" includes any substance (and combination of substances) that is characteristic of, pertains to, or is derived from living organisms and which is capable of being acted upon by any enzyme produced by a bacteria-based binder, as the term bacteria-based binder is defined in this application, including substances such as coffee, pistachio shells and coconut shells. Applicant does not represent that it has used every one of the substances so defined, but believes that substances meeting this definition are capable of being 3D printed; the use of all organic substrates and combinations other than coffee, pistachio shells and coconut shells are prophetic examples.

"Phenolic binder" includes, for example, phenol-formaldehyde resins chosen from the following classes: novolacs and resoles, when said classes are used as binding resins in a 3D printing process.

"Physical vapor deposition" means cathodic arc or sputtering; cathodic arc meaning the use of low voltage combined with high currents to create electrical arc discharges inside a vacuum chamber to superheat a cathode made of the material to be deposited, thereby creating simultaneous evaporation and ionization; and sputtering meaning the use of ionized gas to ablate ("sputter") a target to create a thin film of the material to be deposited onto a substrate and includes the use of direct current ("DC"), radio frequency ("RF"), mid-frequency ("MF"), pulsed DC and High Power Impulse Magnetron Sputtering ("HiPIMS").

"Pistachio shells" includes the hulls of pistachios, including when said hulls have been dried or roasted and then ground to powder.

"Silicate binder" includes, for example, sodium silicate used as an inorganic binder in a 3D printing process.

"Starch-rich materials" comprises plants that contain a substantial amount of starch, such as, for example, oats, flour, rice, potatoes, and corn.

"Trace amounts" means an average concentration of less than 100 parts per million (ppm) measured in the atomic count or less than 100 micrograms per gram. Importantly, however, where the exemplary processes set forth above describe using "trace amounts" of, e.g., carbon, they are not intended to foreclose the use of greater than trace amounts of carbon in the performance of the described process. Rather, they are indicating that only "trace amounts" of, e.g., carbon need be used, not that only "trace amounts" of, e.g., carbon must be used or that the use of "trace amounts" of, e.g., carbon is a limitation of the invention.

"UV" includes ultraviolet electromagnetic radiation with wavelengths from about 160 nanometers to about 380 nanometers, with a pulse rate of about ten milliseconds or less.

Applicant has used copper, chromium and nickel in various of the processes and products by process that are disclosed as exemplary embodiments in this application. The disclosure of the possible use of other elements and alloys are made as prophetic examples that Applicant believes can be used based upon literature known to those skilled in the arts of electroplating, atomic layer deposition and physical vapor deposition.

Applicant has used coffee, pistachio shells and coconut shells in various of the processes and products by process that are disclosed as exemplary embodiments in this application. The disclosure of the possible use of other organic substrates are made as prophetic examples that Applicant believes can be 3D printed.

While the present exemplary embodiments are shown in the drawings and fully described above with particularity and detail, it will be apparent to those of ordinary skill in the art that many modifications thereof may be made without departing from the principles and concepts set forth herein, including, but not limited to, variations in size, materials, shape, form, function and manner of operation, assembly, and use.

Hence, the proper scope of the present application should be determined only by the appended claims to encompass all such modifications as well as all relationships equivalent to those illustrated in the drawings and described in the specification.

Finally, it will be appreciated that the purpose of the annexed Abstract is to enable various patent offices throughout the world, the public generally, and especially the scientists, engineers, and practitioners in the art who are not familiar with patent or legal terms or phraseology, to determine quickly from a cursory inspection the nature and essence of the technical disclosure of this application. Accordingly, the Abstract is not intended to define the invention or the application, which are defined only by the claims, and the Abstract is not intended to limit the scope of the invention in any way.

INDUSTRIAL APPLICABILITY

The disclosed embodiments and the methods associated therewith have applicability to the area of 3D printing materials, 3D printing processes, sinks, toilets, faucets, coffee mug molds, lighting fixtures and coffee cups.

CITATION LIST

Patent Literature von Hasseln, in US 2013/0034633 and CN 106957378A, "3D Printing Preparation Method of Polymer-based Gradient Material."
KR 20170102588A, "Coffee Waste Recycled 3D Architecture Tile."

The invention claimed is:
1. A process for using an enzyme to bind and harden 3D printed compositions that use a filler, the process comprising:
   obtaining one or more fillers to use in a 3D printer;
   choosing a means for binding an enzyme to the one or more fillers
   adding the means for binding an enzyme to particles of the one or more fillers to create a mixture of particles of the one or more fillers and the means for binding an enzyme, the means for binding an enzyme being one or more inulin-rich materials or starch-rich materials;
   creating a 3D printing composition by adding the following to the mixture of particles of the one or more fillers and the means for binding an enzyme:
      one or more enzyme-based binders;
      one or more food sources for the enzyme-based binders, wherein the food source may be the one or more fillers itself, if the one or more fillers has the qualities of a food source for the enzyme;
      one or more nitrogen sources for the enzyme-based binders; and
      one or more calcium sources for the enzyme-based binders;
   loading a 3D file that defines an object to be printed onto a 3D printer 3D printing the object to be printed using the 3D printing composition; and
   keeping the resulting 3D printed object moist until a natural cement hardening time has elapsed.

2. The process of claim 1, wherein the means for binding an enzyme further comprises a means for binding enzyme-producing bacteria.

3. The process of claim 2,
wherein the one or more fillers are comprised of one or more of the following: coffee, pistachio shells, coconut shells, or sand,
wherein the volumes of the one or more fillers may be as follows:
if the one or more fillers comprises sand, then the one or more fillers further comprises one or more of coffee, pistachio shells, or coconut shells, with:
coffee constituting not more than about 30 percent of the volume of all fillers of the one or more fillers;
pistachio shells constituting not more than about 35 percent of the volume of all fillers of the one or more fillers; and
coconut shells constituting not more than about 50 percent of the volume of all fillers of the one or more fillers;
if the one or more fillers does not comprise sand, then the one or more fillers further comprises one or more of coffee, pistachio shells, or coconut shells, where:
coffee may constitute any amount of the volume of all fillers of the one or more fillers;
pistachio shells may constitute any amount of the volume of all fillers of the one or more fillers; and
coconut shells may constitute any amount of the volume of all fillers of the one or more fillers;
wherein the means for binding enzyme-producing bacteria to the one or more fillers is selected from one or more of: Jerusalem artichoke, sweet potato, oyster-plant, leek, chicory (*Cichorium intybus*), artichoke, onion, garlic, shallot, elecampane (*Inula helenium*), or bananas, and
wherein the enzyme-producing bacteria is selected from one or more organisms comprising the following class: *Sporosarcina Pasteurii*, *Sporosarcina Ureae*, *Proteus Vulgaris*, *Bacillus Sphaericus*, *Myxococcus Xanthus*, *Proteus Mirabilis*, or *Helicobacter Pylori*.

4. A 3D printed product made by the process of claim 1.

5. The 3D printed product of claim 4, wherein the 3D printed product is plated.

6. A process for using one or more of coffee, pistachio shells, coconut shells, sand, or combinations thereof, as fillers in 3D printing, the process comprising:
obtaining one or more fillers, the one or more fillers comprising one or more of the following: coffee, pistachio shells, coconut shells, or sand, wherein the volumes of the one or more fillers may be as follows:
if the one or more fillers comprises sand, then the one or more fillers further comprises one or more of coffee, pistachio shells, or coconut shells, with:
coffee constituting not more than about 30 percent of the volume of all fillers of the one or more fillers;
pistachio shells constituting not more than about 35 percent of the volume of all fillers of the one or more fillers; and
coconut shells constituting not more than about 50 percent of the volume of all fillers of the one or more fillers;
if the filler does not comprise sand, then the one or more fillers further comprises one or more of coffee, pistachio shells, or coconut shells, where:
coffee may constitute any amount of the volume of all fillers of the one or more fillers;
pistachio shells may constitute any amount of the volume of all fillers of the one or more fillers; and
coconut shells may constitute any amount of the volume of all fillers of the one or more fillers;
selecting a means for binding dried particles of the one or more fillers in a 3D printer;
forming a 3D printing composition between dried particles of the one or more fillers and the means for binding dried particles of the one or more fillers; and
loading a 3D file that defines an object to be printed onto a 3D printer and 3D printing the object to be printed using 3D printing composition.

7. The process of claim 6,
wherein if non-flammability is desired, an enzyme-based binder or a phenolic binder is selected as the means for binding dried particles of the one or more fillers in a 3D printer,
wherein if flammability is irrelevant, one or more of a non-phenolic binder or a phenolic binder is selected as the means for binding dried particles of the one or more fillers in a 3D printer, the non-phenolic binder comprising one or more of an enzyme-based binder, a furan binder, a silicate binder, or a lignin sulfonate binder.

8. The process of claim 7, further comprising:
cleaning the 3D printed object;
infusing the 3D printed object with a layer of metallized epoxy or non-metallized epoxy either by painting the metallized epoxy or non-metallized epoxy on or by coating the 3D printed object with the metallized epoxy or non-metallized epoxy in a vacuum;
drying the infused metallized epoxy or non-metallized epoxy;
sanding the infused metallized epoxy or non-metallized epoxy to a desired finish;
placing a seed layer of copper on the 3D printed object; and
electroplating the 3D printed object in copper.

9. The process of claim 8, further comprising:
electroplating the 3D printed object in a desired electroplatable metal, the desired electroplatable metals comprising at least one of chrome or nickel.

10. The process of claim 6, further comprising:
generating an ozone atmosphere with an ozone concentration between about 1 kg/adt to about 10 kg/adt, with an upper limit from about 12 percent of ozone by volume to about 13 percent of ozone by volume, wherein one or more means may be used to generate the ozone atmosphere, the means including corona discharge or the use of ultraviolet (UV) electromagnetic radiation, and if UV electromagnetic radiation is used to create the ozone, then wavelengths in the range of about 160 nanometers to about 380 nanometers are used, with a pulse rate of about ten milliseconds or less;
immersing the 3D printed object in the ozone atmosphere until it becomes a desired translucent or white color; and
removing the 3D printed object from the ozone atmosphere.

11. The process of claim 10, wherein the wavelengths of UV electromagnetic radiation include both 184.9 nm and 253.7 nm and the exposure of the 3D printed object to UV electromagnetic radiation of the wavelengths neutralizes biological contaminants such as mold in the 3D printed object.

12. The process of claim 10, wherein UV light of wavelengths of 184.9 nm and 253.7 nm is used to neutralize microbiological contaminants such as mold in 3D printing fillers including one or more of coffee, pistachio shells, or coconut shells.

13. The process of claim 6, further comprising:

if advantageous to an action of grinding the one or more fillers, or if the one or more fillers do not have a moisture content of approximately 5% by weight or less, then drying the one or more fillers to a moisture content of approximately 5% by weight or less; and if the one or more fillers are not of consistent particle size in the range from about 165 μm to about 380 μm, then grinding the one or more fillers and sorting the resulting particles to create a powder of the one or more fillers with consistent particle size in the range from about 165 μm to about 380 μm.

14. The process of claim 6, wherein the means for binding comprises one or more of the following: a furan binder, a silicate binder, a phenolic binder, or a lignin sulfonate binder.

15. The process of claim 6, wherein the means for binding is a phenolic binder or an enzyme-based binder for creating a non-flammable 3D printing composition.

16. The process of claim 6, further comprising powder coating the 3D printed object with a thermoplastic or a thermoset polymer.

17. Lighting fixtures created by the process of claim 6, the process further comprising:

cleaning the 3D printed lighting fixture;

infusing the 3D printed lighting fixture with a layer of metallized epoxy or non-metallized epoxy either by painting the metallized epoxy or non-metallized epoxy on or by coating the 3D printed object with the metallized epoxy or a non-metallized epoxy in a vacuum;

drying the infused metallized epoxy or non-metallized epoxy;

sanding the infused metallized epoxy or non-metallized epoxy to a desired finish;

if a metallic finish is desired, then placing a seed layer of copper on the 3D printed lighting fixture, while if no metallic finish is desired, then the process and the product are complete;

electroplating the 3D printed lighting fixture in copper, and if no additional metallic finish is desired, then the process and the product are complete; and if a chrome finish is desired, then electroplating the 3D printed lighting fixture in chrome.

18. Coffee cups created by the process of claim 6, the process further comprising:

cleaning the 3D printed coffee cup;

infusing the 3D printed coffee cup with a layer of metallized epoxy or non-metallized epoxy either by painting the metallized epoxy or non-metallized epoxy on or by coating the 3D printed object with the metallized epoxy or a non-metallized epoxy in a vacuum;

drying the infused metallized epoxy or non-metallized epoxy;

sanding the infused metallized epoxy or non-metallized epoxy to a desired finish;

if a metallic finish is desired, then placing a seed layer of copper on the 3D printed coffee cup, while if no metallic finish is desired, then the process and the product are complete;

electroplating the 3D printed coffee cup in copper, and if no additional metallic finish is desired, then the process and the product are complete; and if a chrome finish is desired, then electroplating the 3D printed coffee cup in chrome.

19. A 3D printed product made by the process of claim 6.

20. A composition of matter, comprising:

particles that are approximately in the range of about 165 μm in diameter to about 380 μm in diameter, chosen from one or more of the following fillers: coffee, pistachio shells, coconut shells, or sand;

where the volumes of the one or more fillers may be as follows:

if the one or more fillers comprises sand, then the one or more fillers further comprises one or more of coffee, pistachio shells, or coconut shells, with:

coffee constituting not more than about 30 percent of the volume of all fillers of the one or more fillers;

pistachio shells constituting not more than about 35 percent of the volume of all fillers of the one or more fillers; and coconut shells constituting not more than about 50 percent of the volume of all fillers of the one or more fillers;

if the one or more fillers does not comprise sand, then the one or more fillers further comprises one or more of coffee, pistachio shells, or coconut shells, where:

coffee may constitute any amount of the volume of all fillers of the one or more fillers;

pistachio shells may constitute any amount of the volume of all fillers of the one or more fillers; and coconut shells may constitute any amount of the volume of all fillers of the one or more fillers; and a composition for binding the selected particles in a 3D printer, the composition for binding comprising one or more of the following: an enzyme-based binder, a furan binder, a silicate binder, a phenolic binder, or a lignin sulfonate binder.

* * * * *